(12) United States Patent
Shimano et al.

(10) Patent No.: US 7,215,609 B2
(45) Date of Patent: May 8, 2007

(54) OPTICAL REPRODUCING APPARATUS

(75) Inventors: Takeshi Shimano, Tokorozawa (JP); Hirofumi Sukeda, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 560 days.

(21) Appl. No.: 10/231,001

(22) Filed: Aug. 30, 2002

(65) Prior Publication Data

US 2003/0223325 A1 Dec. 4, 2003

(30) Foreign Application Priority Data

Jun. 3, 2002 (JP) .......................... P2002-160907

(51) Int. Cl.
*G11B 7/09* (2006.01)

(52) U.S. Cl. .............. 369/44.37; 369/44.41; 369/112.07

(58) Field of Classification Search ............ 369/44.12, 369/44.23, 44.37, 44.41, 53.11, 112.01, 112.02, 369/112.03, 112.04, 112.05, 112.22, 44.26, 369/112.08, 53.22, 44.29, 94, 121, 112.15, 369/44.11, 44.32
See application file for complete search history.

(56) References Cited

U.S. PATENT DOCUMENTS

| | | | | |
|---|---|---|---|---|
| 4,532,522 A | * | 7/1985 | Tsunoda et al. | 369/44.38 |
| 5,648,950 A | * | 7/1997 | Takeda et al. | 369/44.37 |
| 5,892,744 A | * | 4/1999 | Ohba | 369/44.41 |
| 5,963,515 A | * | 10/1999 | Shindo | 369/44.23 |
| 6,229,771 B1 | * | 5/2001 | Kosoburd et al. | 369/44.23 |
| 6,278,681 B1 | * | 8/2001 | Nagano | 369/112.16 |
| 6,430,125 B1 | * | 8/2002 | Alon et al. | 369/44.32 |
| 6,646,975 B1 | * | 11/2003 | Uchizaki et al. | 369/121 |
| 6,788,628 B2 | * | 9/2004 | Katayama | 369/44.37 |
| 6,963,522 B2 | * | 11/2005 | Katayama | 369/44.37 |
| 2002/0118611 A1 | * | 8/2002 | Kim et al. | 369/44.11 |

FOREIGN PATENT DOCUMENTS

| | | |
|---|---|---|
| JP | 61-94246 | 5/1986 |
| JP | 9-120568 | 5/1997 |
| JP | 2001-126297 | 5/2001 |
| JP | 2001-243651 | 9/2001 |

\* cited by examiner

*Primary Examiner*—Tan Dinh
*Assistant Examiner*—Kim-Kwok Chu
(74) *Attorney, Agent, or Firm*—Mattingly, Stanger, Malur & Brundidge, P.C.

(57) ABSTRACT

An optical reproducing apparatus that uses a hologram laser module and is applicable to a DVD Multi drive, wherein five sub spots of light in total that are most suitable to perform the differential push-pull tracking both for DVD-RAM and for DVD-R/RW are irradiated on the disk, respectively, and influence of several sub spots that are unnecessary in recording and reproducing a disk is canceled out by calculation, to realize an optical head that is compatible with the DVD Multi drive using a hologram laser module, and thereby providing a small-size, high-performance optical reproducing apparatus.

17 Claims, 29 Drawing Sheets

| DISK CLASSIFICATION | RAM1 | | RAM12 | | ROM/RRW | | CD/CD-R | |
|---|---|---|---|---|---|---|---|---|
| GUIDE GROOVE PITCH (μm) | 1.48 | | 1.23 | | 0.74 | | 1.60 | |
| SPOT ARRANGEMENT ON THE DISK | | | | | | | | |
| SUB SPOT POSITION (±μm) — IDEAL | 0.74 | 0.37 | 0.615 | 0.307 | 0.74 | 0.37 | 0.80 | 0.40 |
| SUB SPOT POSITION (±μm) — THIS INVENTION | 0.68 | 0.34 | 0.68 | 0.34 | 0.68 | 0.34 | 0.82 | 0.41 |
| TR SYSTEM | DPP | | | | DPP (DPD) | | TWIN BEAM | |
| AF SYSTEM | DISTURBANCE CANCELING TYPE ASTIGMATIC METHOD | | | | | | | |

※UNDERLINED NUMERIC DATA IN THE FIELD OF IDEAL SUB SPOT POSITION INDICATES A POSITION OF SUB SPOT TO BE USED FOR TRACKING, AND OTHER NUMERIC DATA INDICATES A POSITION OF SUB SPOT WHOSE INFLUENCE IS CANCELED OUT.

FIG. 4

| DISK CLASSIFICATION | RAM1 | RAM12 | ROM/RRW | CD/CD-R |
|---|---|---|---|---|
| GUIDE GROOVE PITCH (μm) | 1.48 | 1.23 | 0.74 | 1.60 |
| SPOT ARRANGEMENT ON THE DISK | | | | |
| SUB SPOT POSITION (±μm) IDEAL | 0.74 | 0.615 | 0.37 | 0.40 |
| SUB SPOT POSITION (±μm) THIS INVENTION | 0.68 | 0.68 | 0.34 | 0.41 |
| | 0.37 | 0.307 | 0.74 | 0.80 |
| | 0.34 | 0.34 | 0.68 | 0.82 |
| TR SYSTEM | DPP | DPP | DPP (DPD) | TWIN BEAM |
| AF SYSTEM | DISTURBANCE CANCELING TYPE ASTIGMATIC METHOD | | | |

※UNDERLINED NUMERIC DATA IN THE FIELD OF IDEAL SUB SPOT POSITION INDICATES A POSITION OF SUB SPOT TO BE USED FOR TRACKING, AND OTHER NUMERIC DATA INDICATES A POSITION OF SUB SPOT WHOSE INFLUENCE IS CANCELED OUT.

AF = A−B+C−D+E− (F1+F2) + (G1+G2) −H
DPP = (A+B−C−D) − (E+F1+F2−G1−G2−H)
DPD = Phase (A+C) −Phase (B+D)
TB = T1−T2

RAM1

RAM1

RAM2

ROM/R/RW

CD/CD-R

ROM/R/RW

CD/CD-R

F I G. 1 9
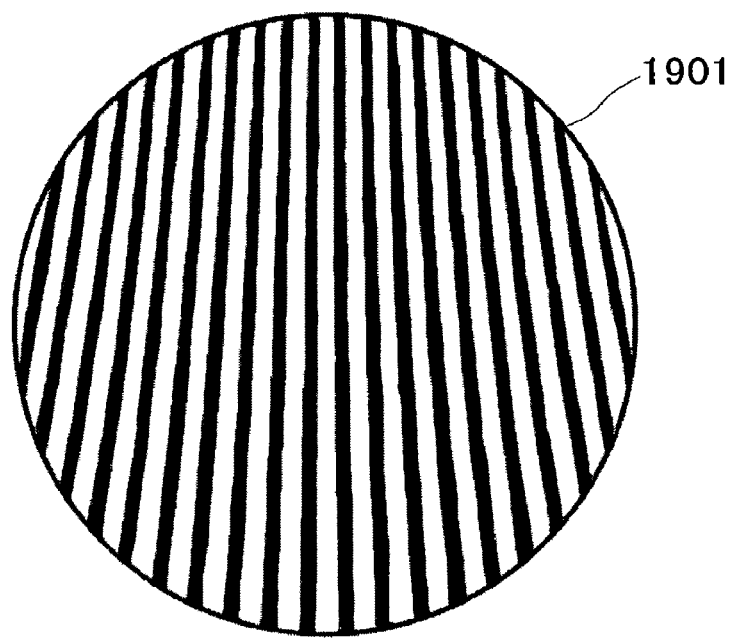
F I G. 2 0
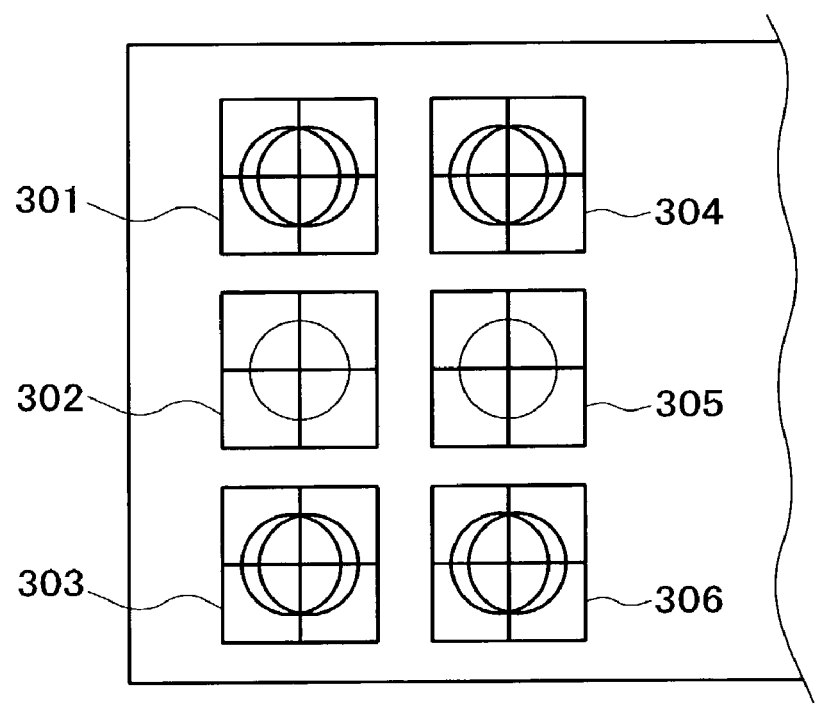

DVD-R/RW

DVD-RAM

SUB SPOT   MAIN SPOT   SUB SPOT w < p/2

DVD-R/RW

DVD-RAM

AF (RW) =A1−B1+C1−D1+K1 (A2−B2+C2−D2+A3+C3−D3)
AF (RAM) =A1−B1+C1−D1+K1 (A4−B4+C4−D4+A5−B5+C5−D5)
DPP (RW) =A1+B1−C1−D1−K1 (A2+B2−C2−D2+A3+B3−C3−D3)
DPP (RAM) =A1+B2−C1−D1−K1 (A4+B4+C4−D4+A5+B5−C5−D5)
DPD=Phase (A1+C1)−Phasw (B1+D1)
TB=T1−T2

2801

AF=A+B−C−D−E+F
DPP=A−B+D−E−K(G−H+I−J)
DPD=Phase(A+B)−Phase(D+E)
TB=T1−T2 or (G+H)−(I+J)

AF=A1−B1+C1−D1+K (A2−B2+C2−D2+A3−B3+C3−D3)
DPP=A1+B1−C1−D1−K (A2+B2−C2−D2+A3+B3−C3−D3)
TB= (A2+B2+C2+D2) − (A3+B3+C3+D3)
DPD=Phase (A1+C1) −Phase (B1+D1)

OPTICAL REPRODUCING APPARATUS

BACKGROUND OF THE INVENTION

1. Field of the Invention

This invention relates to an optical disk apparatus, and more particularly to an optical head technology whereby plural classifications of optical disks are reproduced.

2. Description of Related Art

As commercial optical disks of a current size of 120 mm, there stand abreast a variety of standards such as DVD-ROM, DVD-RAM, DVD-R, DVD-RW, CD-R, and CD-RW in addition to the conventional music CD and CD-ROM according to the difference in recording density, capability of recording, erase, and rewriting, reliability, and distinction of application. A problem has been pointed out that these existing plural standards introduce confusions among common users, and recently optical disk apparatuses in conformity to a standard called "DVD Multi," indicating capability of recording and reproducing all of these optical disks, have been released as commercial products.

As one of differences among the above-mentioned plural classifications of optical disks, first there can be enumerated a difference in wavelength between CD systems and DVD systems. In the beginning of release of DVD, to achieve compatibility in reproducing CDs on DVD apparatuses, the apparatus used a red semiconductor laser expressly meant for DVD. However, since CD-R in which reproduction wavelength is limited to the same infrared wavelength as the conventional CD has become popular rapidly, such an apparatus that has both the red semiconductor laser and the infrared semiconductor laser in it and uses the infrared semiconductor laser for the CD systems has become established generally.

As other differences, there can be enumerated differences in shapes of a pit sequence and of a guide groove used for tracking (hereinafter, referred to as "guide groove" as a generic term indicating the both) and a difference in the tracking system associated with those differences. For the tracking system, mainly CD-ROM uses the twin beam method; CD-R, RW, DVD-R, RW use the differential push-pull method; DVD-ROM uses the differential phase detection method; and DVD-RAM uses the push-pull method that uses a polarization-dependent diffraction grating.

The push-pull method is a method in which imbalance of a reflected light intensity distribution generated on a pupil plane of the objective lens resulting from diffraction of light by the guide groove and an interference effect between beams of the diffracted light. The imbalance of the intensity distribution on the pupil plane can be obtained by detecting the spots by two-segment detectors on planes shifted some what from the focal plane, on which normally the detector is placed, and obtaining a differential signal between detected signals. This is used as a tracking error signal. Since the imbalance of the intensity distribution is caused by the interference effect between beams of the diffracted light, the detection sensitivity of the tracking error by this method becomes highest when the guide groove depth is equal to an optical depth of ⅛ wavelength and the guide groove width is one-half the guide groove pitch—here, the optical depth is assumed as a depth reduced to ½ wavelength or less where the diffraction and interference effects at that depth become equivalent to those of the original (not reduced) depth using a wavelength in the substrate of the optical disk as a reference. Further, at the optical depth of ¼ wavelength, theoretically the tracking error signal amplitude by the push-pull method becomes zero. With respect to the tracking error signal detection by the push-pull method, a problem has been pointed out for many years. This is a problem that a false tracking error signal (hereinafter referred to as "offset") is generated because, when the objective lens is moved in connection with the tracking operation (hereinafter referred to as "lens shift"), the optical spot on the photodetector also moves in accordance with the movement.

One of methods proposed as a method for preventing this is the differential push-pull method, which is disclosed by the second embodiment of JP-A No. 94246/1986. In the differential push-pull method, two sub spots are arranged, on both sides of a focused spot on the disk plane, at a distance shifted from the focused spot in a radial direction by one-half the guide groove pitch, and the differential signal between the push-pull signal by the central focused spot (hereinafter referred to as a "main spot") and the push-pull signals of the sub spots is used as the tracking error signal. The offset associated with the lens shift occurs in the same polarity for the main spot and for the sub spots, whereas the tracking error signal occurs in the reverse polarity for the main spot and for the sub spots because the main spot and the sub spots are arranged with their positions being shifted by one-half the guide groove pitch. Therefore, by obtaining the differential signal of these error signals, a component of the tracking error signal is enhanced and the offset is canceled out. A diffraction grating that generally has a row of linear unit gratings is used to form the sub spots, and sub-spot positions on the disk are adjusted by rotation adjustment of the grating.

Another method for preventing occurrence of the offset by the lens shift in the push-pull method is a method that uses the polarization-dependent diffraction grating. The polarization-dependent diffraction grating is a diffraction grating made of a birefringent material such as anisotropic optical crystals and liquid crystals, and it has a function of acting as a diffraction grating for one linear polarization whereas it has a function of generating no diffracted light for linear polarization perpendicular to that linear polarization because phase difference caused by the grating becomes an integral multiple of the wavelength of the light. If this component is integrated with a quarter-wave plate in one body and linearly polarized light from which no diffracted light is produced while passing through the component is entered into the integrated body, the incident light passes through the quarter-wave plate and is transformed to circularly polarized light without being diffracted by the polarization-dependent diffraction grating. When this light is reflected by an optical disk etc. and reenters the polarization-dependent diffraction grating, diffraction effect takes place in the polarization-dependent diffraction grating because after first passing through the quarter-wave plate the light is transformed into linearly polarized light whose polarization direction is perpendicular to that of the linearly polarized light at the time of entering the integrated body for the first time. This arrangement can provide a diffraction grating that does not diffract the light in an outward travel and diffracts the light only in a homeward travel. Based on this principle, a grating has been formed to diffract two regions of light that are to be separated and detected by the push-pull method in different directions, and is moved together with the objective lens as one body for the tracking. If light fluxes after being separated by the polarization-dependent diffraction grating are detected by the photodetectors whose light detecting regions are large enough to receive the flux without failing to receive any portion thereof even when the lens shift is done, there is effectively no displacement of the received light flux with respect to a dividing line of the light flux.

Thereby, the occurrence of the offset can be mitigated. However, this method is incomplete in suppressing the offset as compared with the differential push-pull method. The occurrence of the offset by the lens shift is affected not only by the movement of the dividing line for dividing the light flux but also by displacement between the optical axis of the objective lens and the center of the intensity distribution caused by a fact that the intensity distribution of the outgoing light from the semiconductor laser has a Gaussian distribution. In the method in which the polarization-dependent diffraction grating is moved together with the objective lens in one body, the effect by the movement of the dividing line is dissolved, but the influence by the displacement of the center of the intensity distribution remains. Therefore, this method may turn to be insufficient in cases where the push-pull signal amplitude is small, to be more precise, a case where the guide groove-pitch is narrow as compared with the focused spot, a case where the guide groove is shallow, a case where the guide groove width is narrow as compared with the guide groove pitch, etc., that is, cases where the remaining offset becomes notably large.

In the twin beam method, two sub spots are formed on the both sides of the focused spot on the disk, and they are arranged at positions shifted from the main focused spot in a radial direction by one-quarter the guide groove pitch. The tracking error signal is obtained by detecting variation in the total reflected light quantity of each sub spot caused by tracking error between the guide groove on the disk and the sub spots and finding a difference signal between the total reflected light quantities. To form the sub spots, normally a diffraction grating that has a row of linear unit gratings is used, and the sub-spot positions on the disk are adjusted by rotating the grating. Since in the twin beam method the tracking error is obtained by detecting the variations in the total reflected light quantities, its detection sensitivity becomes highest when the guide groove depth is equal to an optical depth of $1/4$ wavelength where the total reflected light quantity exhibits a largest change. Further, since the signal is obtained not from the distribution but from the total light quantity, there does not occur offset that is caused by the lens shift and may become a problem in the push-pull method. Further, since this method requires that the reflected light quantity when the spot is on the guide groove differ from the reflected light quantity when the spot is between the guide grooves, if the guide groove width and a spacing between the guide grooves are the same in dimension, the signal cannot be detected theoretically.

The differential phase detection method is a method that is used in DVD-ROM, in which detected is the phase difference between two signal waveforms each of which is obtained by adding the received light quantities falling on diagonally located two regions of the four-segment regions of the photodetector that is produced by an interference effect of the diffracted light fluxes caused by the pit sequence and is proportional to the tracking error on time base. The phase difference becomes largest when the optical depth of the pit is equal to $1/4$ wavelength, which agrees with an optical depth at which a reproduced signal amplitude becomes largest. When the optical depth of the pit is $1/4$ wavelength, the offset by the lens shift does not occur theoretically as well.

As mentioned in the foregoing, in terms of features of the tracking methods, suitable tracking methods are chosen for respective classifications of disks.

That is, in DVD-ROM, since the recording density is high and the optical depth of the pit that were previously recorded is set to $1/4$ wavelength in order to make the signal percentage modulation large, the differential phase detection method is suitable. It is thought possible to apply the twin beam method. However, the differential phase detection method can perform detection with only one spot, and hence the differential phase detection method is chosen. Th push-pull method cannot be applied because theoretically the signal amplitude reduces to zero.

In CD-ROM, the phase depth of the pit is set to $1/6$ wavelength in order that the tracking error signal can be detected even by the push-pull method in specifications. Therefore, considering the influence of the lens shift upon the offset, the twin beam method is suitable. However, even in the differential phase detection method, a method whereby the offset is mitigated by improvement of signal processing has been developed.

In DVD-RAM, the guide groove width is set identical to the spacing between the guide grooves, and the land and groove recording system whereby information is recorded both on the guide groove and between the guide grooves is used. For this reason, the twin beam method is not used therefor, and a method that uses the polarization-dependent diffraction grating is commonly used because the guide groove pitch is wider than that of the under-mentioned DVD-R etc. and can provide a sufficiently large push-pull signal. Although the differential push-pull method has a larger effect of suppressing the offset, the method that uses the polarization-dependent diffraction grating that uses only one beam has been chosen in terms of securing a sufficient margin of light intensity for the recording.

In DVD-R, DVD-RW, CD-R, and CD-RW, the guide groove pitches are narrower than that of the land groove method and information is recorded on the guide grooves whose phase depths are shallow. For this reason, the method that uses the polarization-dependent diffraction grating reduces the effect of suppressing the offset. Further, these optical disks are featured especially by being a low price, it is often the case that the differential push-pull method is chosen rather than the method that uses a somewhat costly polarization-dependent diffraction grating. However, since generally these disks are intended to be equivalent to DVD-ROM and CD-ROM when being reproduced, the same tracking method as DVD-ROM and CD-ROM is applicable in principle when being reproduced.

The optical heads for recording and reproducing the respective optical disks are required to be miniaturized in connection with miniaturization and thinner design of the apparatuses. For example, a hologram laser module capable of reproducing both DVD and CD is disclosed by JP-A No. 120568/1997 (the first conventional example). The hologram laser module is such that a semiconductor laser, a photodetector, and a hologram for guiding reflected light from the optical disk to the photodetector are modularized into one body. In this conventional example, the twin beam method is employed for both DVD and CD (in this conventional example, being referred to as "three beam method"). On the other hand, an optical head that uses a modularized part that is supposed to be used for recording on DVD is disclosed by JP-A No. 126297/2001 (the second conventional example). In this example, a semiconductor laser and a photodetector are modularized into one body, but a hologram for guiding the reflected light from the disk to the photodetector are integrated with the objective lens, being separated from the module. This configuration is adopted because the tracking of recording optical disks, such as DVD-RAM, is assumed.

Further, in the DVD Multi drive described previously, in order to perform tracking of the above-mentioned all classifications of disks, it is very likely that a method in which the polarization-dependent diffraction grating is moved together with the objective lens as one body will be used. In this case, although the offset by the lens shift is not removed completely and its influence remains for DVD whose tracking error signal amplitude is small or the like, this incompleteness is solved by margin allocation design of the whole system.

In the above-mentioned first conventional example, since the twin beam method is employed to execute the tracking control of DVD and CD, no tracking error signal can be obtained for DVD-RAM whose guide groove width is equal to the spacing between the guide grooves. Further, in DVD-R/RW etc. whose guide groove is shallow, the tracking error signal amplitude becomes extremely small. For these reasons, this conventional example is not suitable for recording disks, and hence cannot be applied to the DVD Multi drive.

In the above-mentioned second conventional example, since the polarization-dependent diffraction grating is used to execute the tracking control by the push-pull method, the offset by the lens shift occurs in DVD-R/RW. Further, since it is necessary to mount the polarization-dependent diffraction grating on the objective lens to be an integrated combination, its weight will be a problem in enhancing the speed in the future. Moreover, since the polarization-dependent diffraction grating is independent from the module wherein the semiconductor laser and the photodetector were integrated, it is likely that displacement between the polarization-dependent diffraction grating and the module due to temperature variation and/or change over time will occur. The occurrence of the displacement deteriorates accuracy of focus control of the focused spot and of the tracking control, causing degradation of the reproduced signal.

As a method whereby a hologram (diffraction grating) for branching off detected light without generating the offset by the lens shift even in DVD-RAM and DVD-RW can be integrated with the semiconductor laser and the photodetector, there is the differential push-pull method. However, it is necessary to arrange the sub spots on the disk at positions shifted from the main spot in a radial direction by one-half the guide groove pitch, but the guide groove pitch is almost two times different between DVD-RAM and DVD-RW. DVD-RAM is based on the land groove system whereby information is recorded both on the guide groove and between the guide grooves, whereas DVD-RW etc. are based on a method whereby information is recorded only on the guide groove. Since the both have almost the same recording density, the guide groove pitch of DVD-RAM is two times wider than that of DVD-RW etc. Therefore, positions of the sub spots that are necessary for the differential push-pull method are different for DVD-RAM and for DVD-RW etc., and hence the differential push-pull method cannot be compatible for the two kinds of systems.

SUMMARY OF THE INVENTION

In view of the above-mentioned problems, the object of the present invention is to provide a small-size, high-performance optical reproducing apparatus that uses a hologram laser module and can be applied to the DVD Multi drive.

As lasers, the optical reproducing apparatus is provided with two or more kinds of lasers. Here, in order to reproduce CD and DVD, a red semiconductor laser and an infrared semiconductor laser are used. Further, an objective lens capable of recording and reproducing both DVD and CD is used. This objective lens is described by, for example, JP-A No. 243651/2001.

Formation of light spots according to the present invention is as described below. Means for forming at least five focused spots on the optical disk from each of light emitted from the above-mentioned plurality of lasers is placed between the lasers and the objective lens. For this means, for example, a complex diffraction grating is used. Alternatively, a linear diffraction grating for producing second-order diffracted light is used.

Further, a branching device for branching off these five beams of light reflected from the disk from an optical path of the semiconductor laser to the optical disk is used. For this device, the polarization-dependent diffraction grating that is not integrated with the objective lens is used.

The optical reproducing apparatus is further provided with photodetectors for detecting the above-mentioned five spots.

First, in the case where the complex diffraction grating is used, since it is difficult for the detectors to separate two sets of two spots among the five light spots, the photodetectors may be three light receiving parts for one wavelength. However, in the case where the polarization-dependent diffraction grating is used as the branching device, another three spots are produced on the opposite side across the semiconductor laser from the side of three spots obtained when the polarization-dependent diffraction grating is used, 6 light receiving parts in total become necessary for one wavelength practically. Since there are necessary 6 light receiving parts for another wavelength as well, 12 light receiving parts in total are needed for two wavelengths simply. However, in the case where light receiving parts on the one side to the semiconductor laser can be shared by the two wavelengths, 9 light receiving parts are sufficient for the two wavelengths in practice. Among the above-mentioned 9 light receiving parts, the light receiving parts on one of the two sides sandwiching the semiconductor laser need to be segmented photodetectors in order to achieve the defocus detection and the tracking error detection. The light receiving parts on the other side can be 3 single-segment light receiving parts each of which is not divided. Among these light receiving parts, the reproduced signal (RF signal; RF=Radio Frequency) is obtained from a central light receiving part for receiving light from the central spot among the five spots on the disk. By obtaining the RF signal from the single-segment light receiving part, the noise of an amplifier for converting a photocurrent from the light receiving part to a voltage can be prevented from increasing. In the case where, for example, a pattern for introducing astigmatism is used for the polarization-dependent diffraction grating that is used as the branching device in order to detect the defocus signal from 6 light receiving parts on one side with respect to the semiconductor laser, each of 6 light receiving parts may be a four-segment photodetector. Each of 3 light receiving parts on the opposite side can be a light detecting region that is not divided. However, as already stated, generally regarding the light receiving part that is not divided, 6 light receiving parts in total are necessary for the two wavelengths.

On the other hand, in the case where the linear diffraction grating for producing second-order diffracted light is used as means for forming five spots, 20 light receiving parts become necessary for the two wavelengths because the five spots are independent. The 20 light receiving parts can be reduced to 15 light receiving parts by means of shared use by a design. Among the above-mentioned 15 light receiving parts, the light receiving parts on one of the two sides sandwiching the semiconductor lasers need to be segmented photodetectors in order to achieve the defocus detection and the tracking error detection. The light receiving parts on the other side can be 5 single-segment light receiving parts each of which is not divided. Among these light receiving parts, the reproduced signal (RF signal; RF=Radio Frequency) is obtained from a central light receiving part for receiving light from the central spot among the five spots on the disk. By obtaining the RF signal from the single-segment light receiving part, the noise of an amplifier for converting a photocurrent from the light receiving part to a voltage can be prevented from increasing. In the case where, for example, a pattern for introducing astigmatism is used for the polarization-dependent diffraction grating that is used as the branching device in order to detect defocus signal from 10 light receiving parts on one side to the semiconductor laser, each of 10 light receiving parts may be a four-segment photodetector. 5 light receiving parts on the opposite side can be light detecting regions each of which is not divided, as mentioned above. However, as already stated, generally regarding light receiving parts each of which is not divided, 10 light receiving parts in total are necessary for the two wavelengths.

Moreover, a case where a spot-size detection method as the defocus detection method is employed will be explained, together with the complex diffraction grating. In this case, generally light is not only branched off by the polarization-dependent diffraction grating, but also a converging/diverging state of the light is changed by using a curvilinear pattern for the grating. In this way, the focus positions of the diffracted light are shifted to be in front of and in the rear of the non-diffracted light (zero-order light), and the focus control is executed in such a way that the diffracted light spots having been shifted forward and backward to the focus of the zero-order light take the same size when the focus is on the disk. At this time, normally the light spots in front of and in the rear of the focus are received by three-segment photodetectors, respectively. Normally, the polarization-dependent diffraction grating with a uniform curvilinear pattern yields (+) first-order diffracted light and (−) first-order diffracted light whose foci are shifted to be in front of and in the rear of the focus of the zero-order light, respectively. However, in this embodiment, in order to avoid using a segmented detector as the detector for obtaining the reproduced signal, a polarization diffraction grating that is comprised of two or more regions each introducing a positive or negative change in the convergence of the passing light in a counter changing manner is used, so that the spots whose foci are in front of and in the rear of the focus of the zero-order light can be obtained simultaneously only with the (+) first-order diffracted light or the (−) first-order diffracted light. By this arrangement, on one side of two sides sandwiching the semiconductor laser, 2 three-segment photodetectors become necessary for one wavelength (4 three-segment photodetectors for the two wavelengths in total) and further 4 two-segment photodetectors that are used for receiving the tracking error signals from beams of the (±) first-order diffracted light produced by the by complex diffraction grating become necessary for one wavelength in front of and in the rear of the focus (8 two-segment photodetectors for the two wavelengths in total). In addition, on the other side of two sides sandwiching the semiconductor lasers, 2 light receiving parts are necessary for receiving two light spots in front of and in the rear of the focus for any one of the zero-order light and the (±) first-order diffracted light produced by the complex diffraction grating. Considering that there are three beams of diffracted light in the two wavelengths, 12 light receiving parts become necessary for receiving twelve light spots (i.e., 2×3×2=12). However, with a design whereby 3 light receiving parts are shared to receive two beams of light of different wavelengths, detection can be performed with 9 light receiving parts. Thus, the spot size method increases the number of the light receiving parts as compared with the astigmatic method, but on the other hand it provides a feature that disturbance occurring when the light spot traverses the guide groove is little Among the above-mentioned constituents, the two-wavelength semiconductor laser, the means for forming five spots, the branching device, and the light receiving parts are modularized into one body.

If the light receiving pattern as described above is used, it becomes possible to use DVD-ROM, DVD-RAM, DVD-R, DVD-RW, CD-ROM, CD-R, and CD-RW as reproducing or recording media. The tracking error signal from each medium shall be generated by the following method: for DVD-ROM, by the differential phase detection method; for DVD-RAM, by the differential push-pull method; for DVD-R and DVD-RW, by the differential push-pull method at the time of recording and by either of the differential push-pull method or differential phase detection method at the time of reproducing; for CD-ROM, by one of the twin beam method, the differential push-pull method, and the differential phase detection method; for CD-R and C-RW, by the differential push-pull method at the time of recording and by one of the twin beam method, the differential push-pull method, and the differential phase detection method at the time of reproducing.

Other and further objects, features and advantages of the invention will appear more fully from the following description.

BRIEF DESCRIPTION OF THE DRAWING

FIG. 4 is a view illustrating a method for detecting the tracking error for plural classifications of disks;

Figure 3:
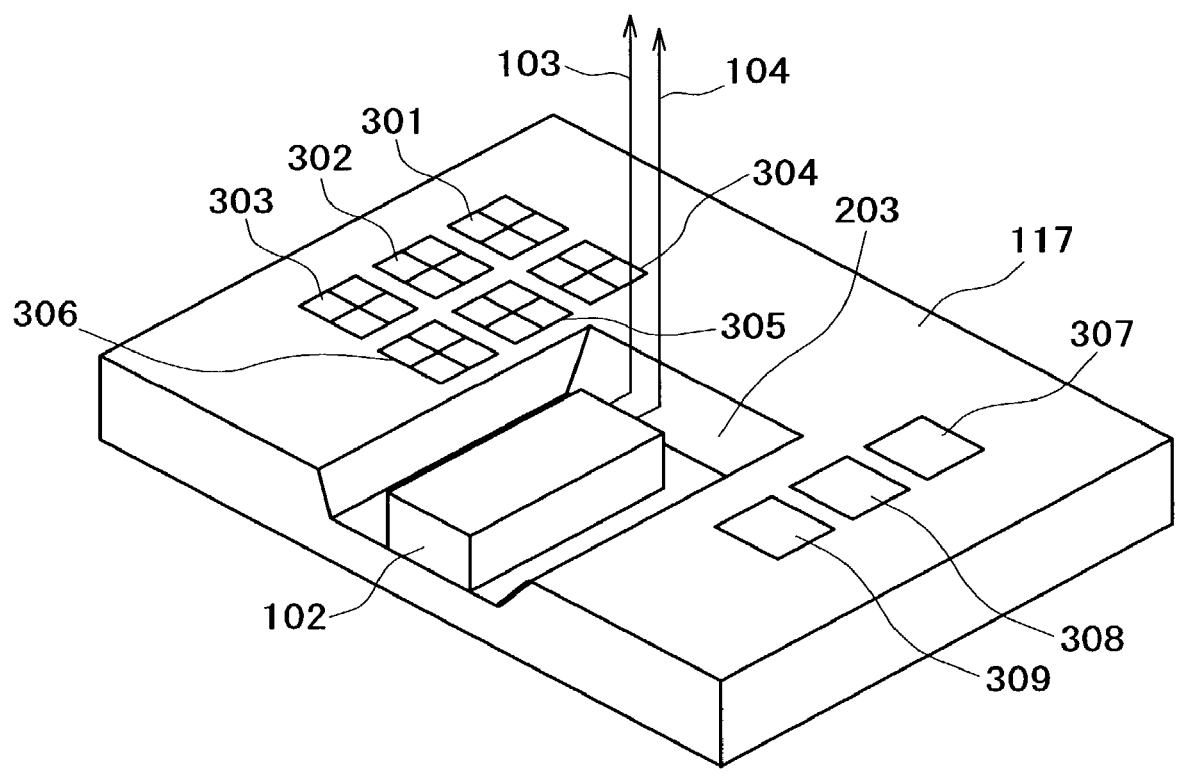
FIG. 3 is a view showing an example of arrangement of the semiconductor lasers and photodetectors on a silicon substrate according to the present invention.
Figure 11:
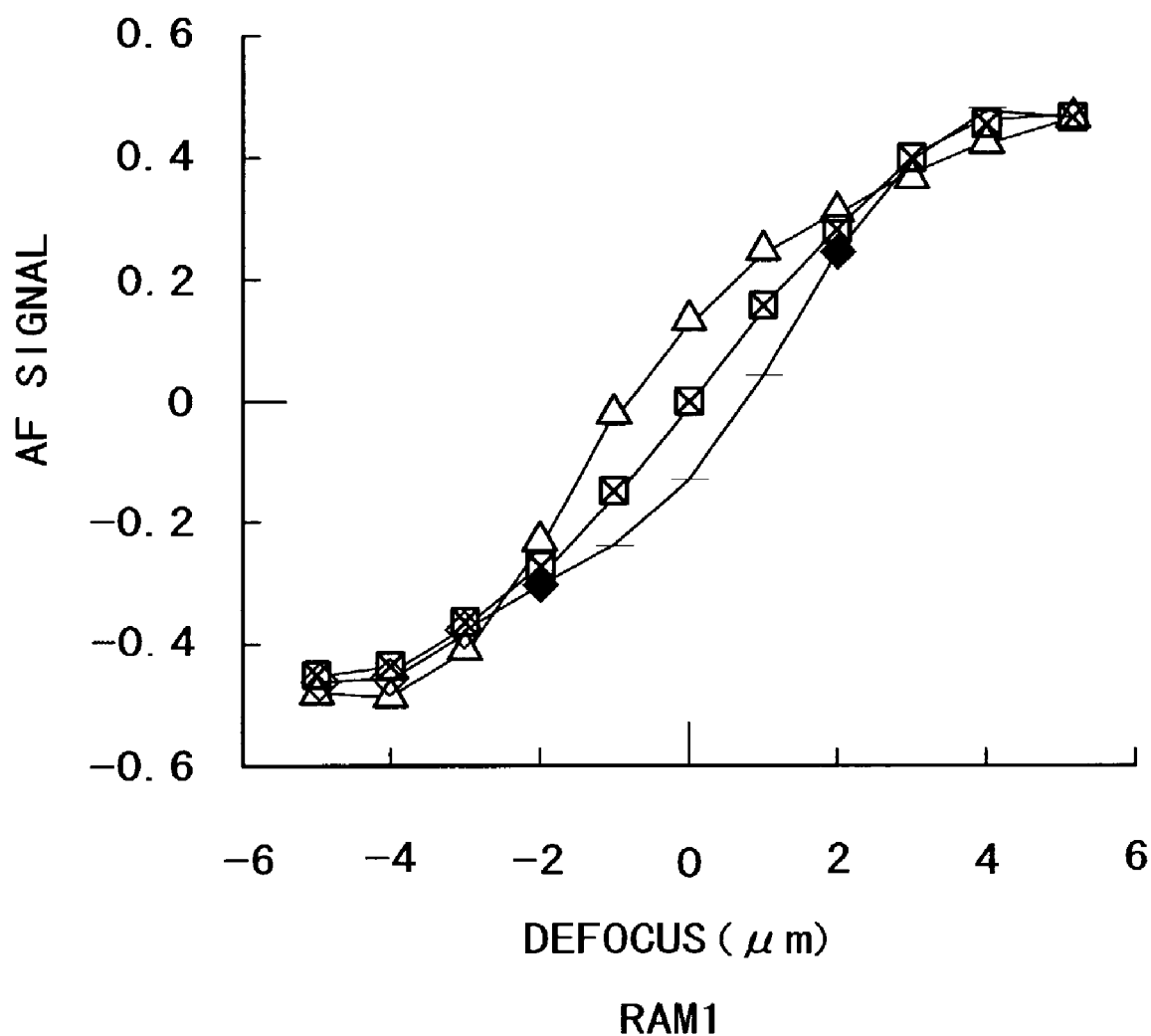
Figure 12:
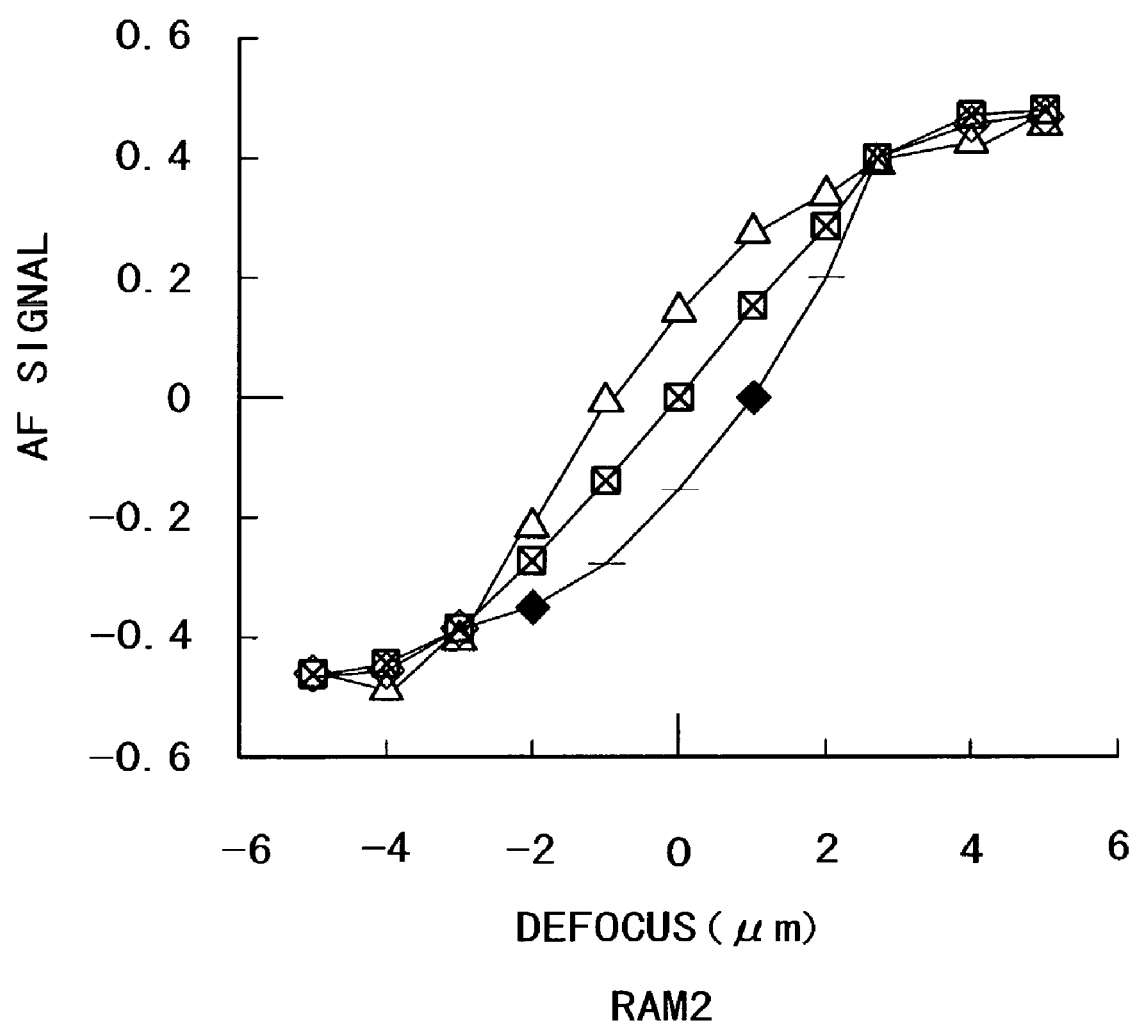
Figure 13:
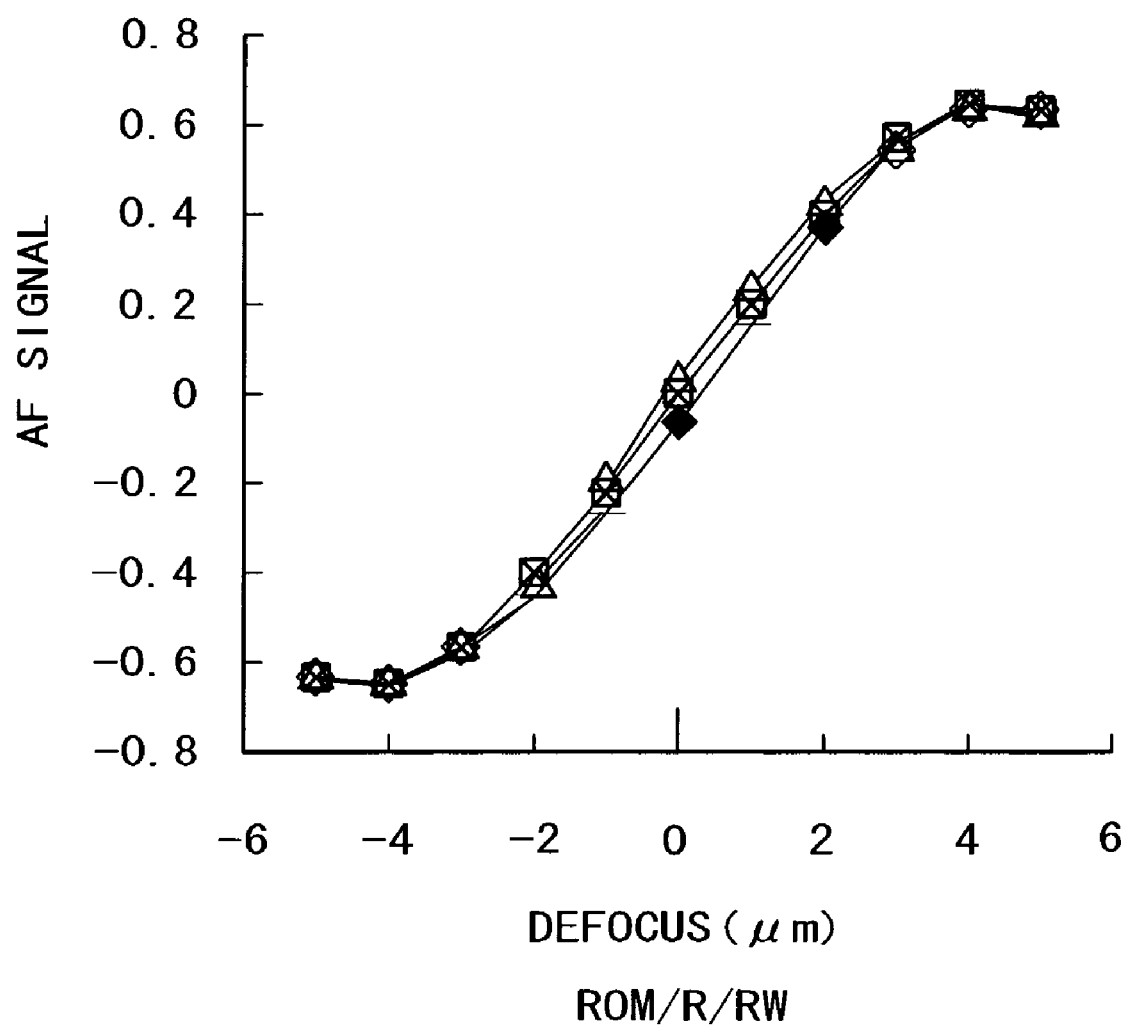
Figure 14:
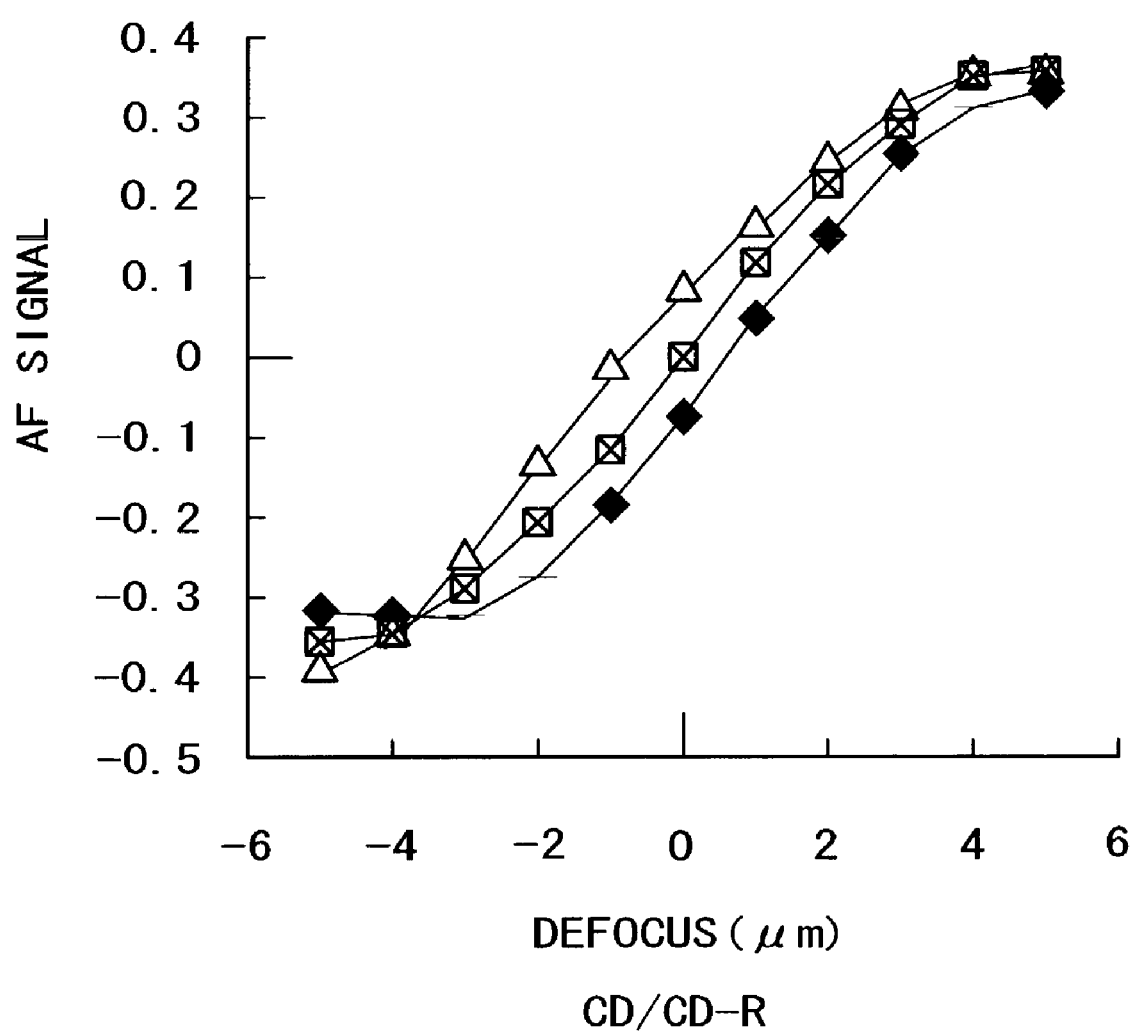
Figure 15:
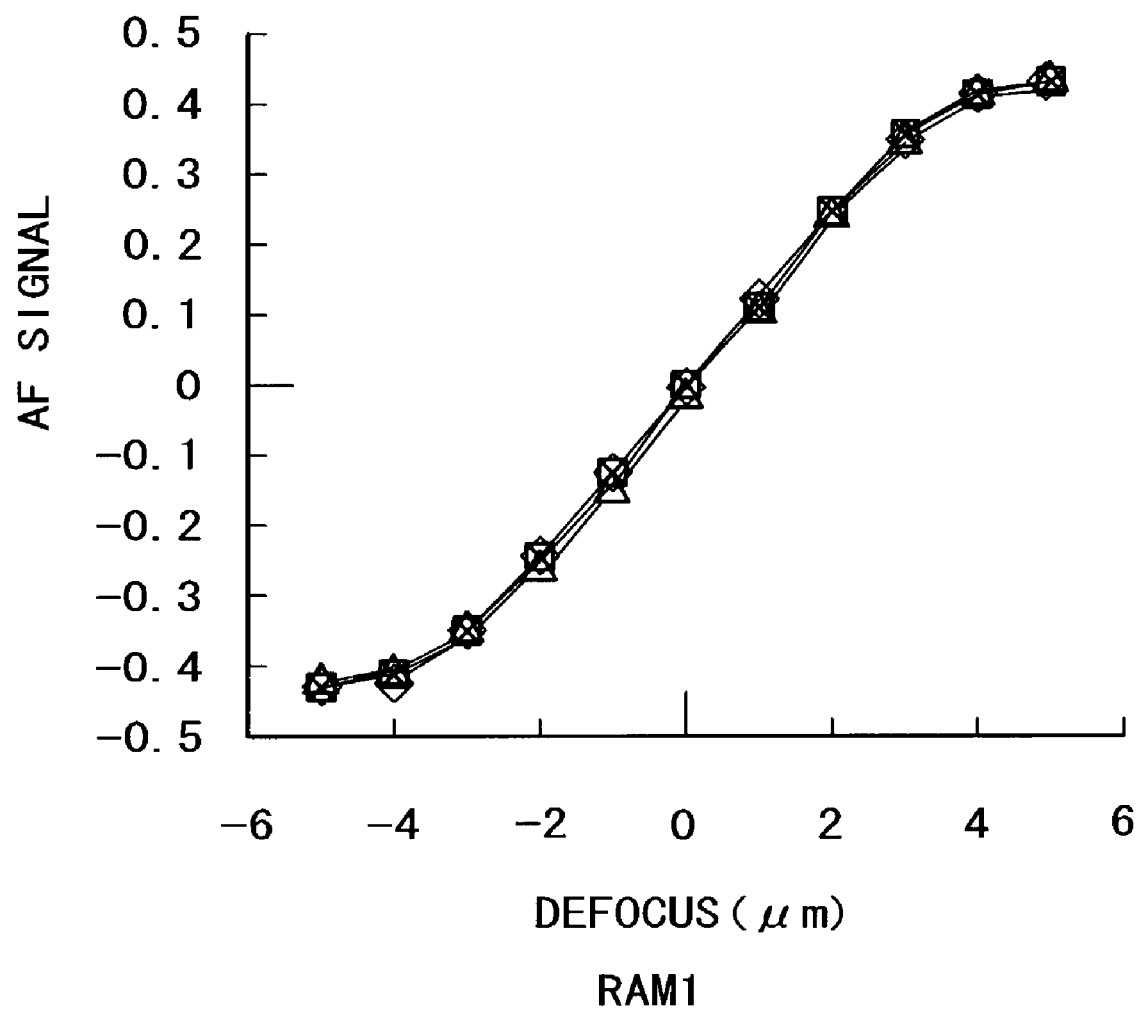
Figure 16:
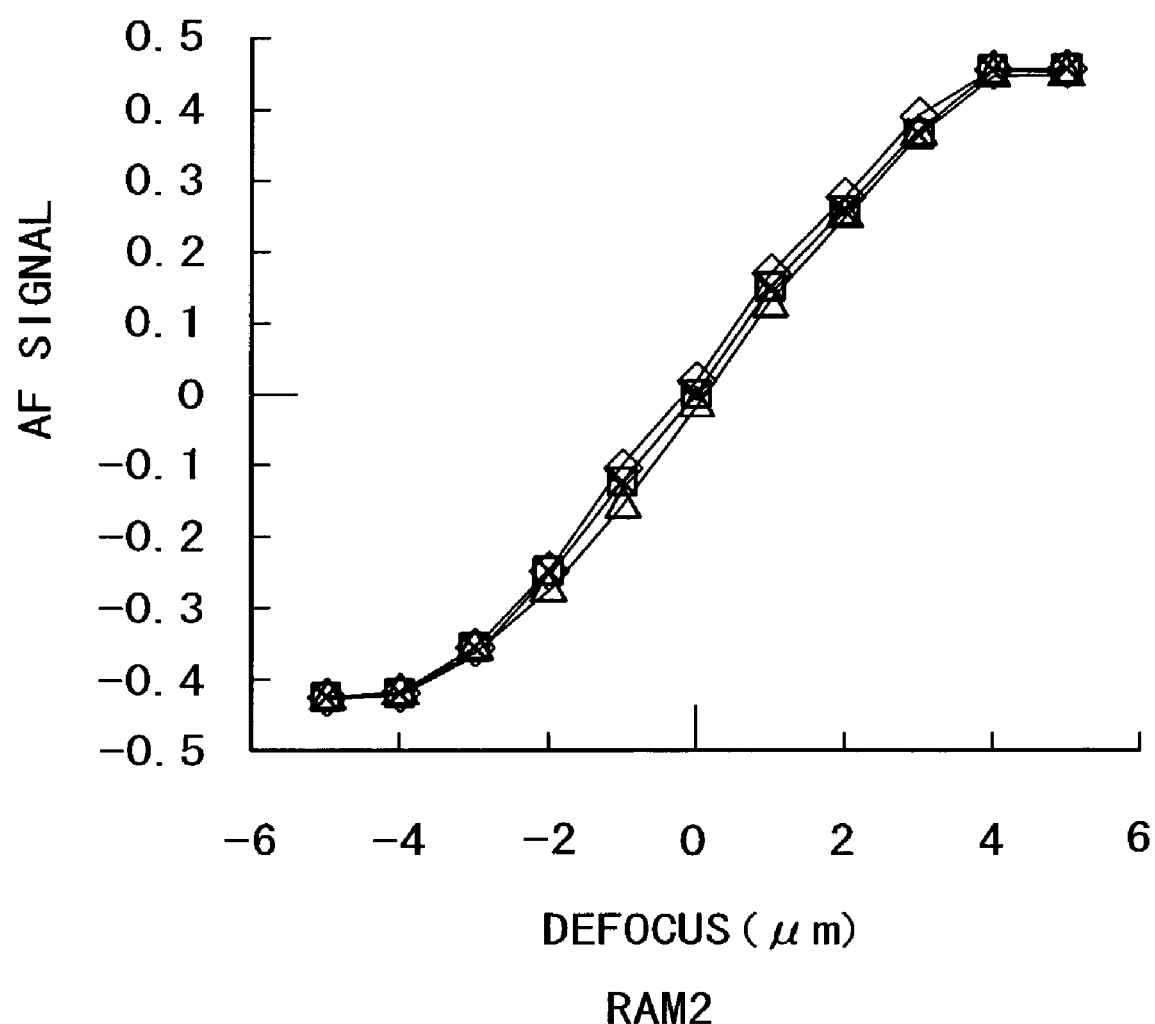
Figure 17:
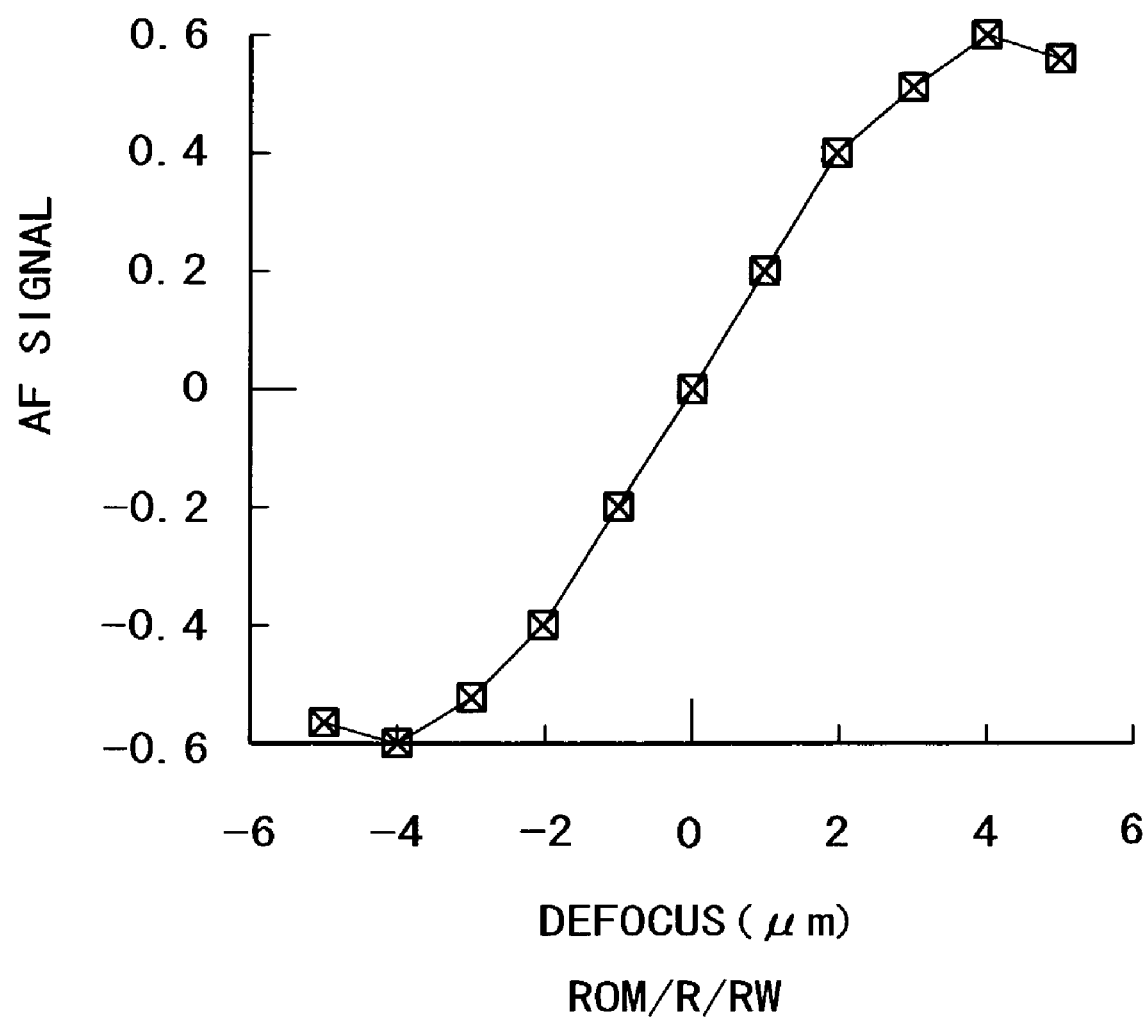
Figure 18:
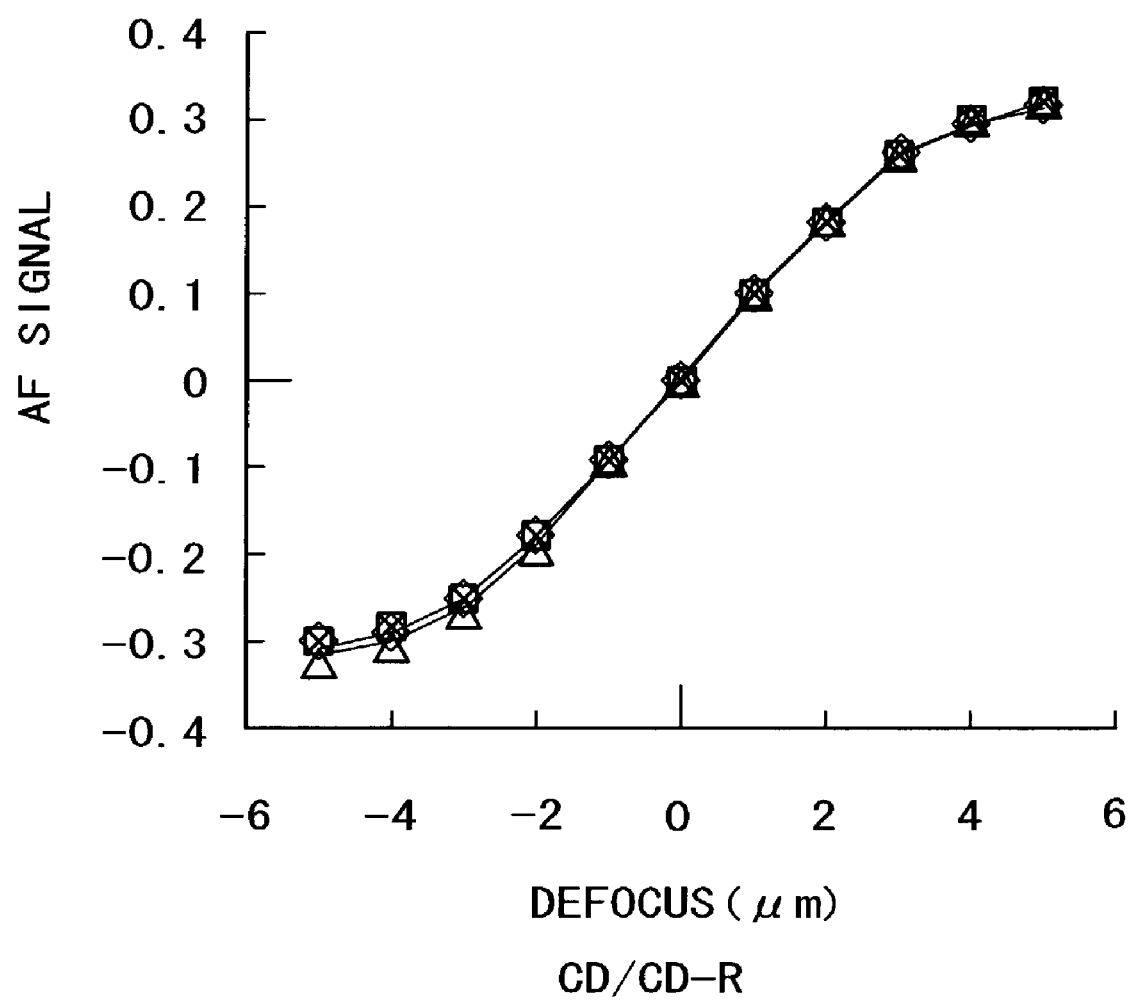
Figure 21:
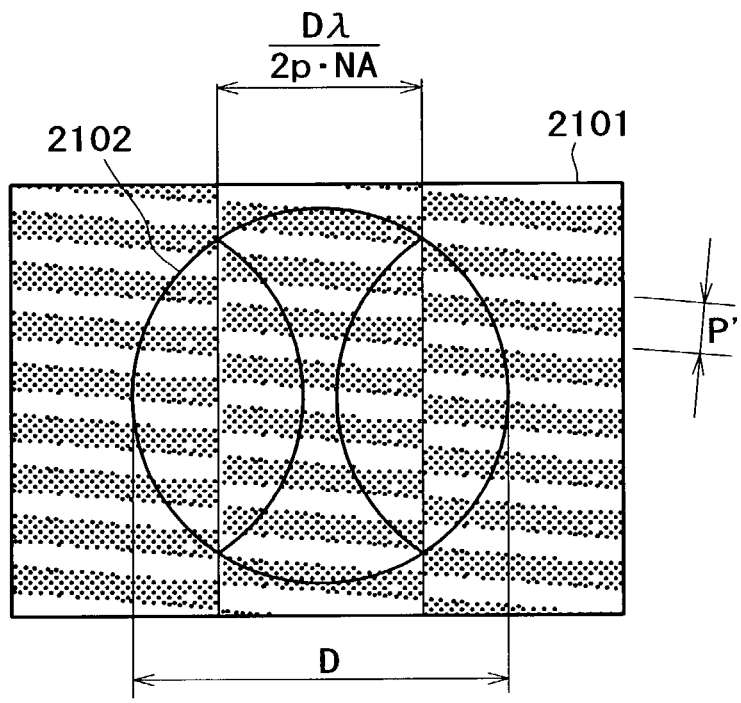
Figure 22A:
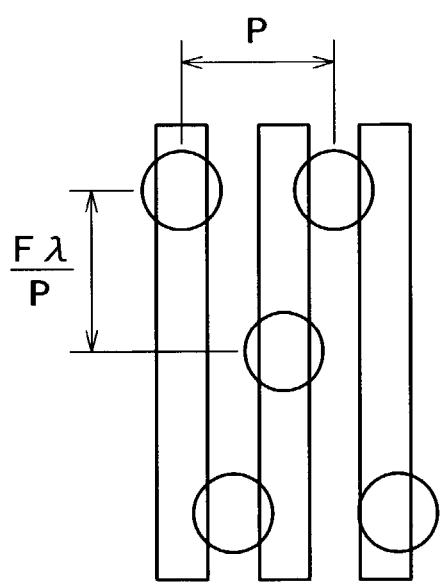
Figure 22B:
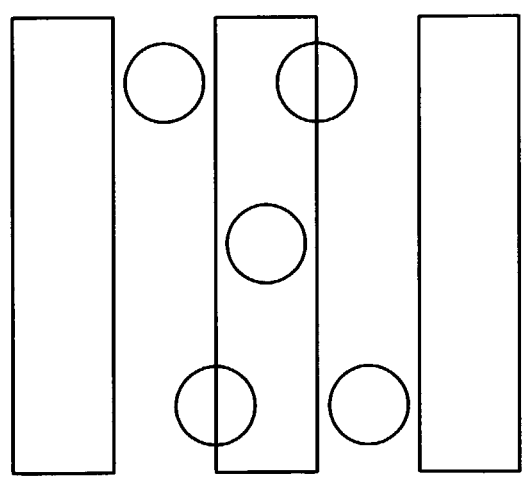
Figure 23:
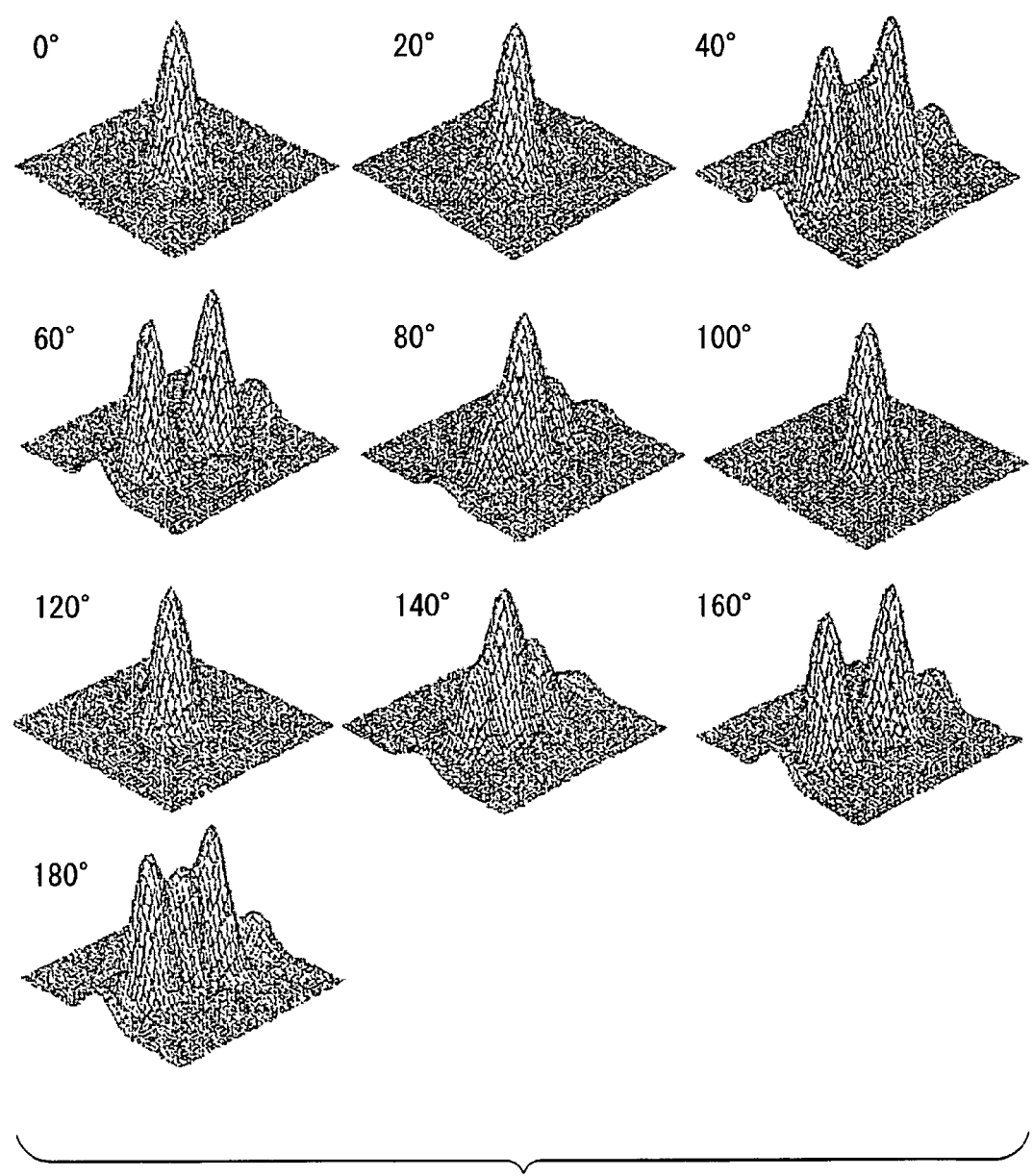
Figure 24:
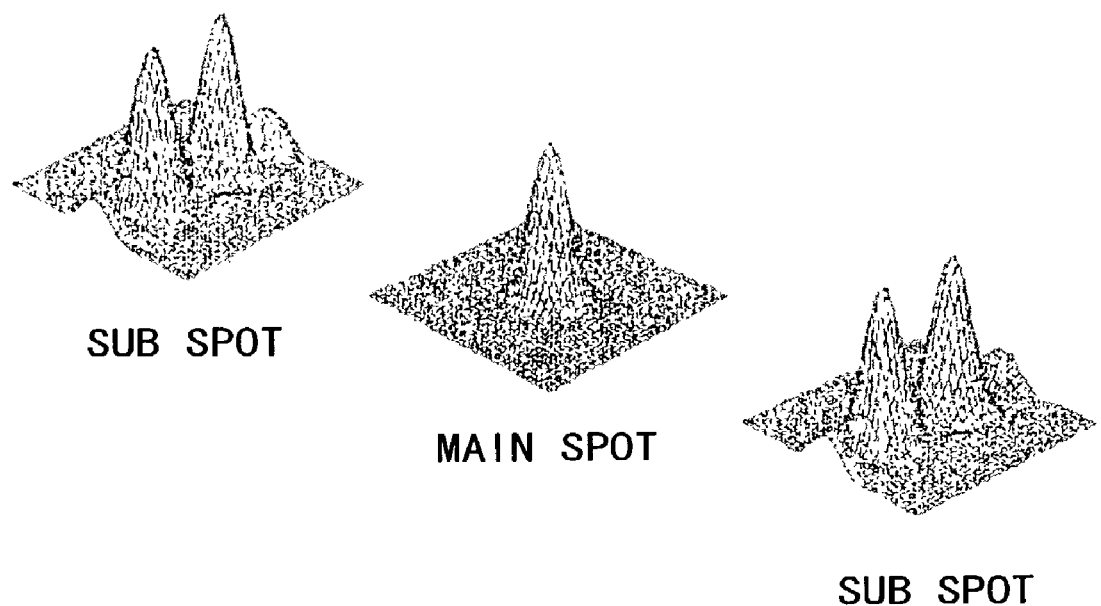
Figure 25:
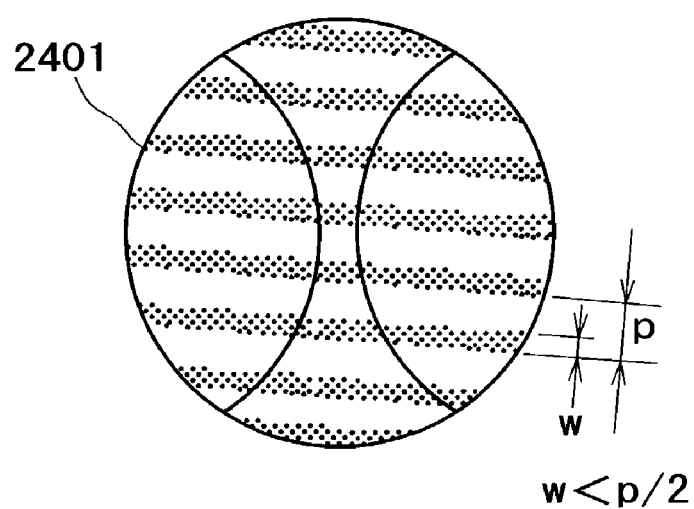
Figure 26A:
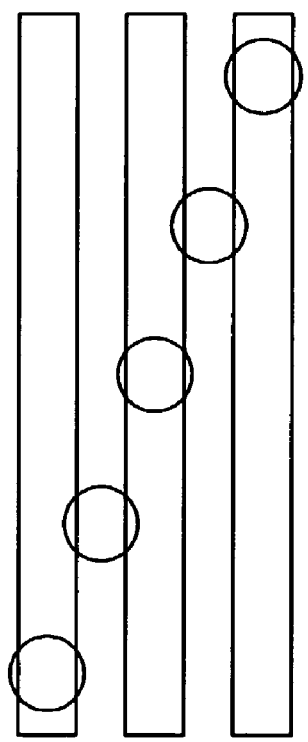
Figure 26B:
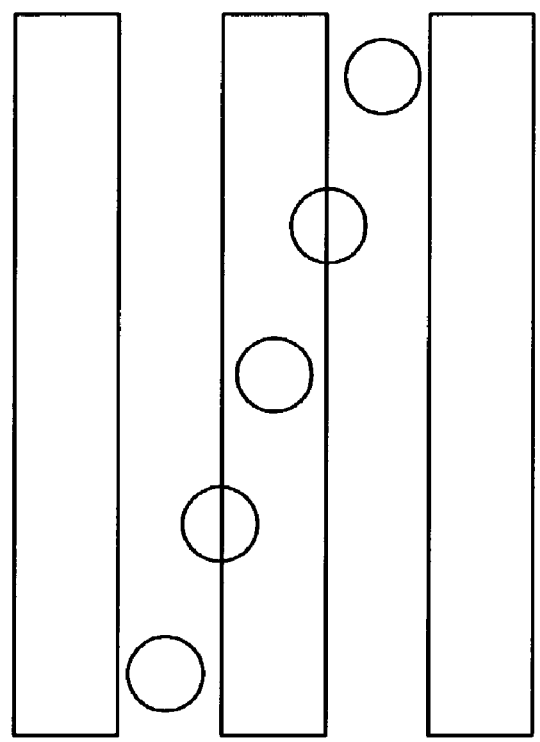
Figure 27:
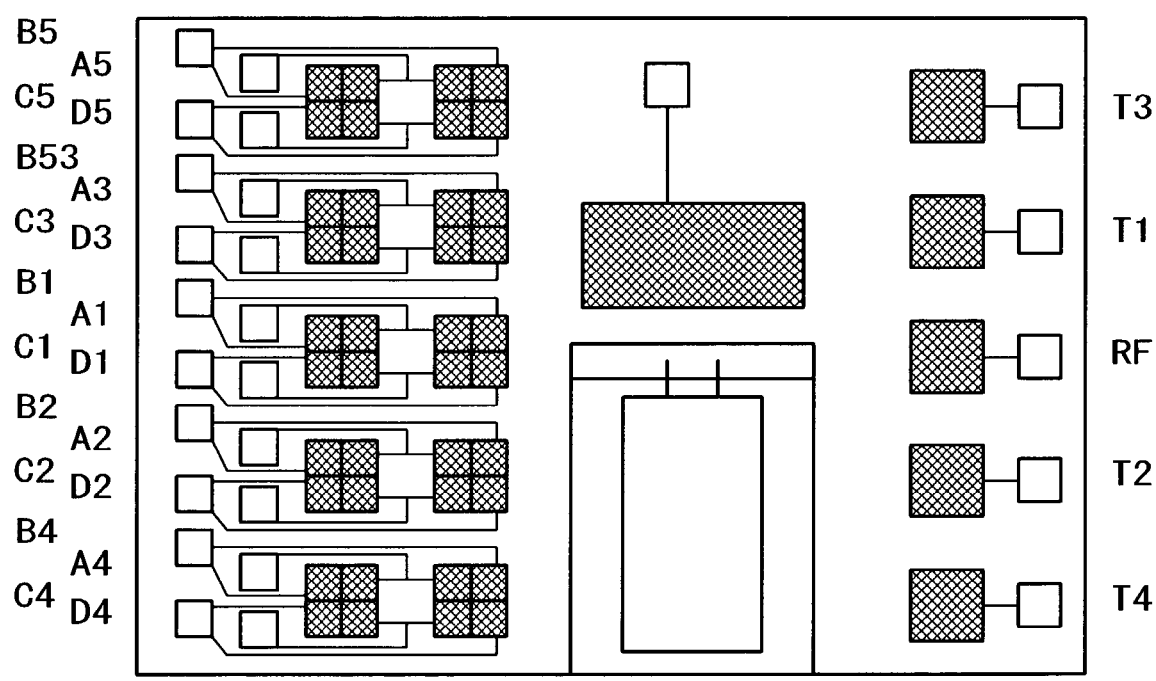
Figure 28:
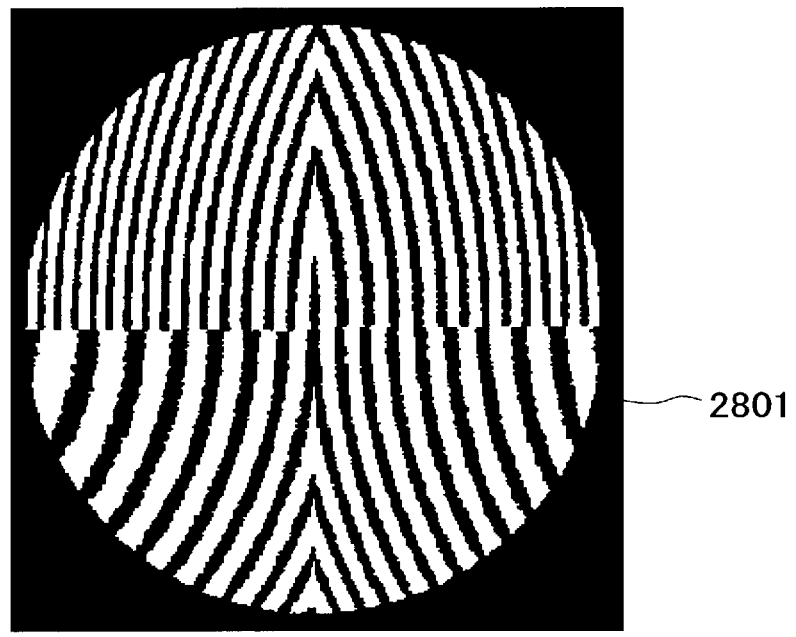
Figure 29:
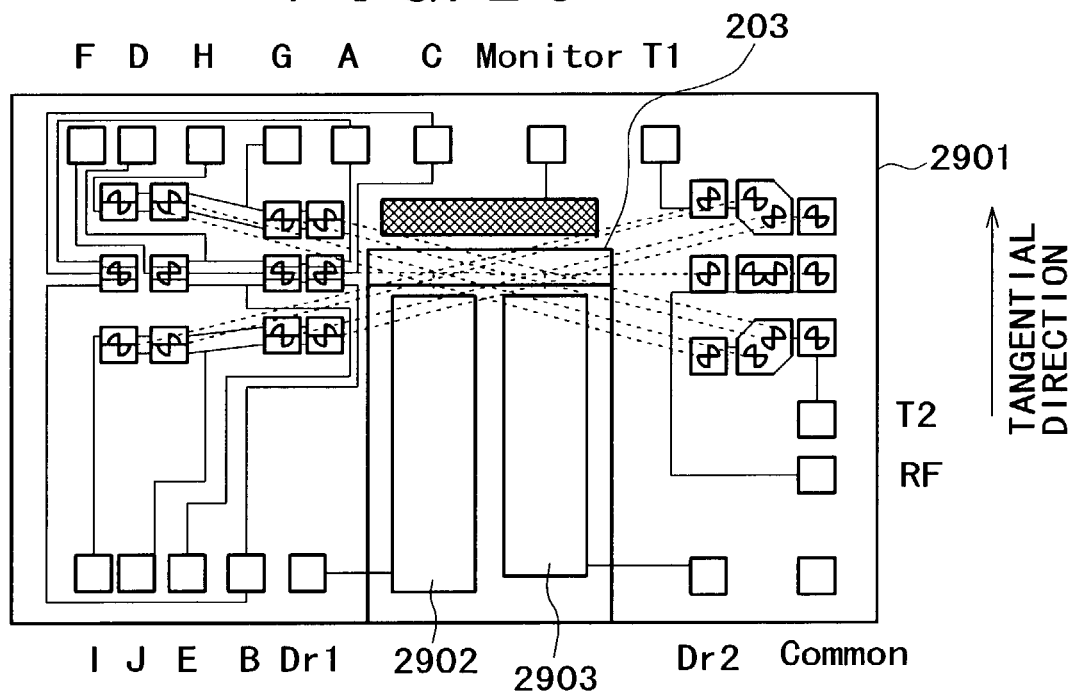
Figure 30:
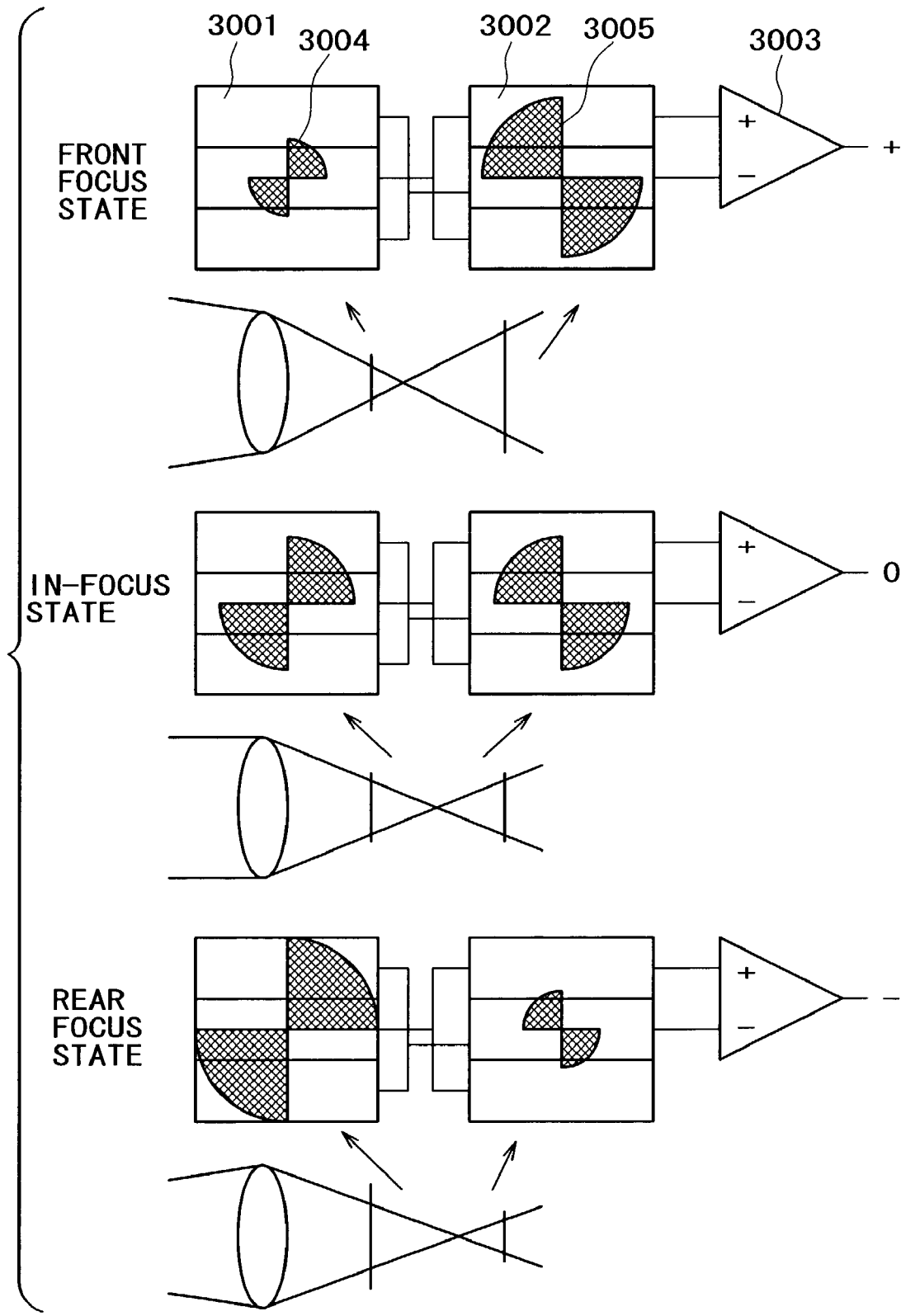
Figure 31:
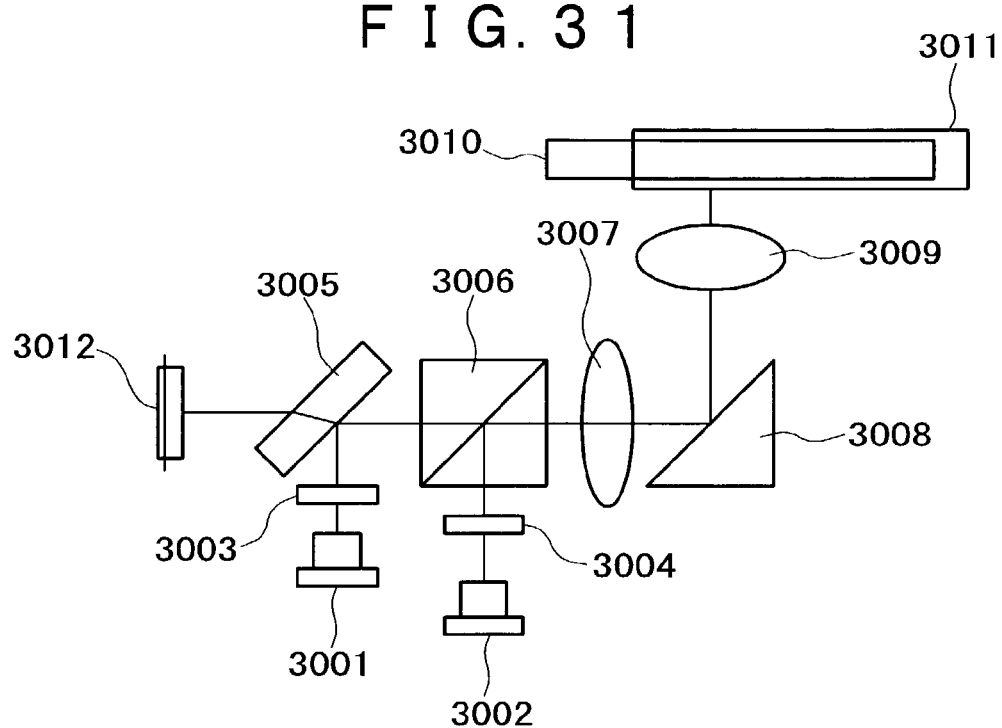
Figure 32:
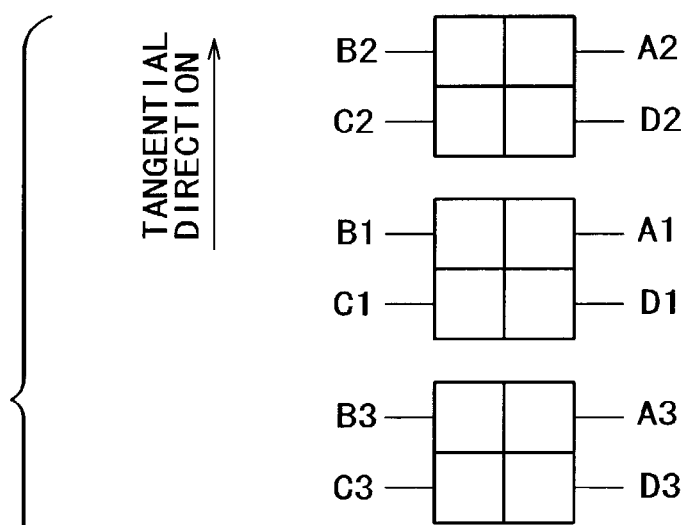
Figure 33:
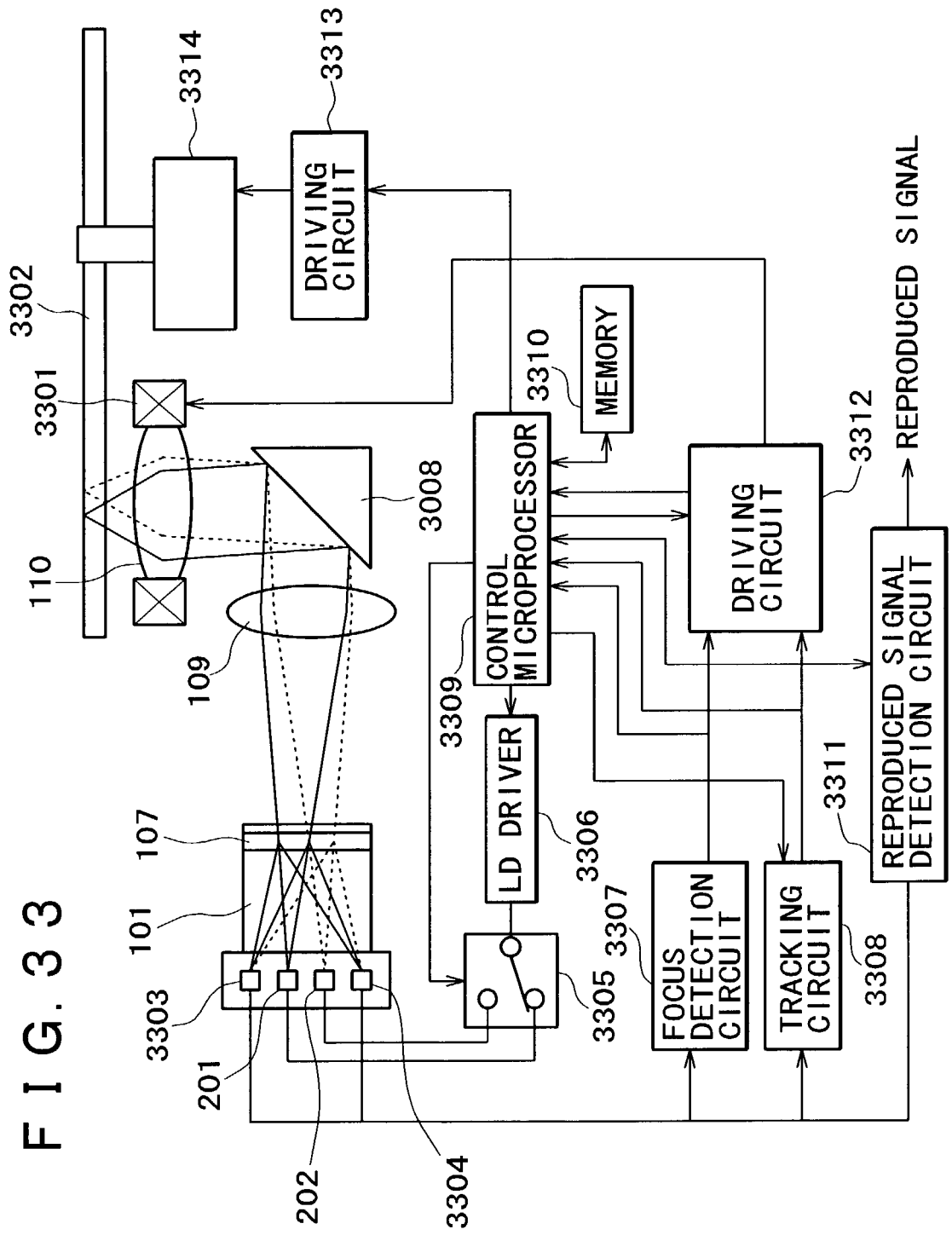
Figure 34:
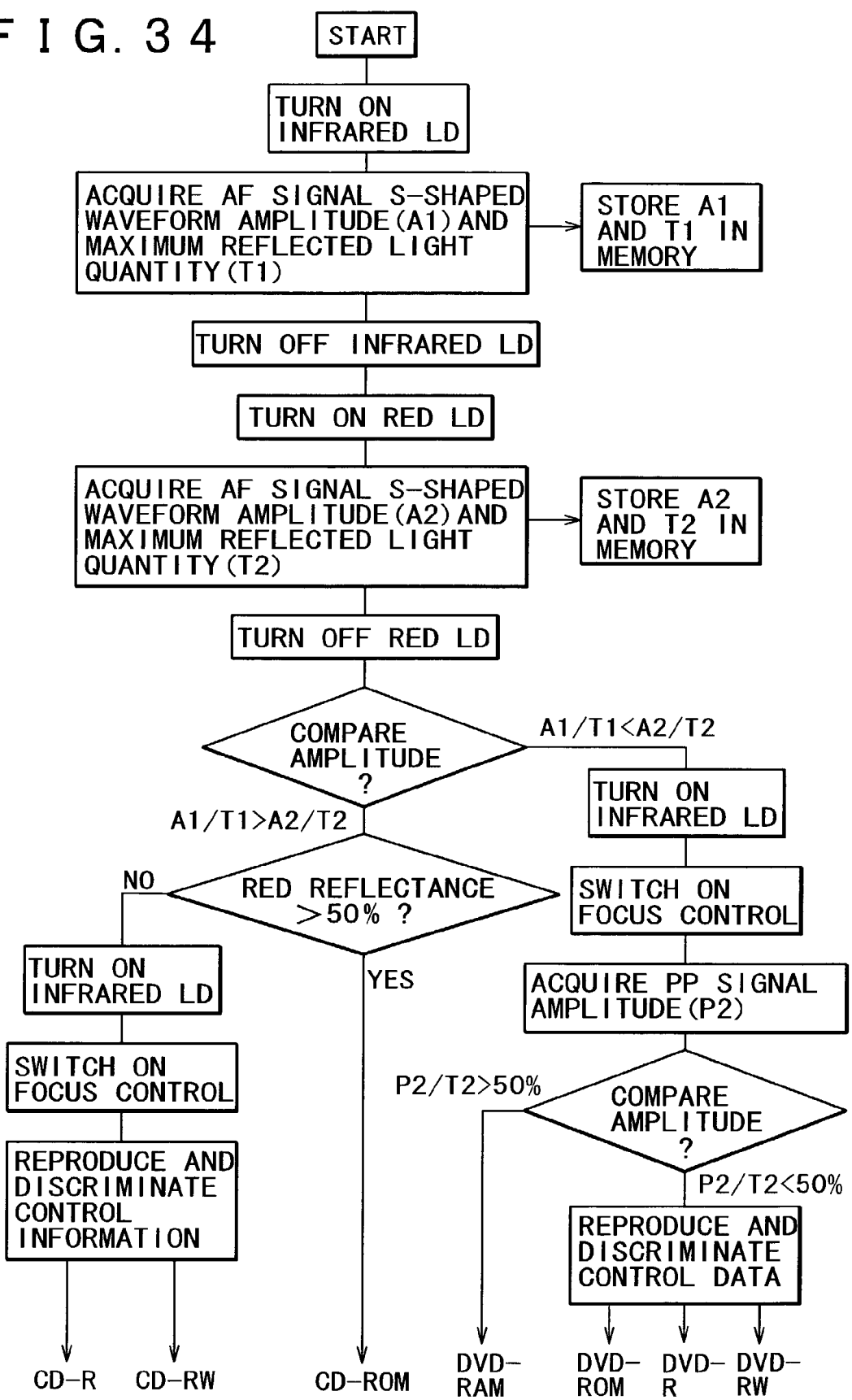

μm and the results of simulation to confirm the effect of offset reduction by the present invention (CD/CD-R);

FIG. 11 is a graph showing the results of simulation of the disturbance to the defocus signal in the main beam by the guide groove under astigmatism of 0.2λ (DVD-RAM1);

FIG. 12 is a graph showing the results of simulation of the disturbance to the defocus signal in the main beam by the guide groove under astigmatism of 0.2λ (DVD-RAM2);

FIG. 13 is a graph showing the results of simulation of the disturbance to the defocus signal in the main beam by the guide groove under astigmatism of 0.2λ (DVD-R/RW);

FIG. 14 is a graph showing the results of simulation of the disturbance to the defocus signal in the main beam by the guide groove under astigmatism of 0.2λ (CD/CD-R);

FIG. 15 is a graph showing the results of confirmation simulation of the effect of reducing the disturbance of FIG. 11 by the present invention (DVD-RAM1);

FIG. 16 is a graph showing the results of confirmation simulation of the effect of reducing the disturbance of FIG. 12 by the present invention (DVD-RAM2);

FIG. 17 is a graph showing the results of confirmation simulation of the effect of reducing the disturbance of FIG. 13 by the present invention (DVD-R/RW);

FIG. 18 is a graph showing the results of confirmation simulation of the effect of reducing the disturbance of FIG. 14 by the present invention (CD/CD-R);

FIG. 19 is a pattern of the polarization-dependent diffraction grating with astigmatism;

FIG. 20 is a view showing arrangement of the five spots on the detectors of FIG. 3;

FIG. 21 is a view showing another embodiment of the complex diffraction grating;

FIG. 22A is a view showing spot arrangement on the disk plane (DVD-R/RW) when another embodiment of the complex diffraction grating is used;

FIG. 22B is a view showing spot arrangement on the disk plane (DVD-RAM) when another embodiment of the complex diffraction grating is used;

FIG. 23 is a view showing sub-spot profiles depending on the phase difference of the complex diffraction grating;

FIG. 24 is a view showing diffracted light by the complex diffraction grating;

FIG. 25 is an illustration showing the linear diffraction grating for producing second-order diffracted light;

FIG. 26A is a view showing the spot arrangement on the disk plane (DVD-R/RW) when the linear diffraction grating for producing second-order diffracted light is used;

FIG. 26B is a view showing the spot arrangement on the disk plane (DVD-RAM) when the linear diffraction grating for producing second-order diffracted light is used;

FIG. 27 is a view showing the laser module's detector pattern when the linear diffraction grating for producing second-order diffracted light is used;

FIG. 28 is a view showing a pattern of the polarization-dependent diffraction grating in the case where the spot-size focus detection method is employed;

FIG. 29 is a view showing an embodiment of the laser module in the case where the spot-size focus detection method is employed;

FIG. 30 is a view explaining the spot-size focus detection method;

FIG. 31 is a view showing an embodiment wherein the present invention is applied to the conventional optical head that does not use the laser module;

FIG. 32 is a diagram showing the light receiving part pattern of the photodetectors of FIG. 31 and formulas of signal processing;

FIG. 33 is a system configuration that uses the laser module according to the present invention;

FIG. 34 is a flow chart for discriminating the medium; and

Figure 35:
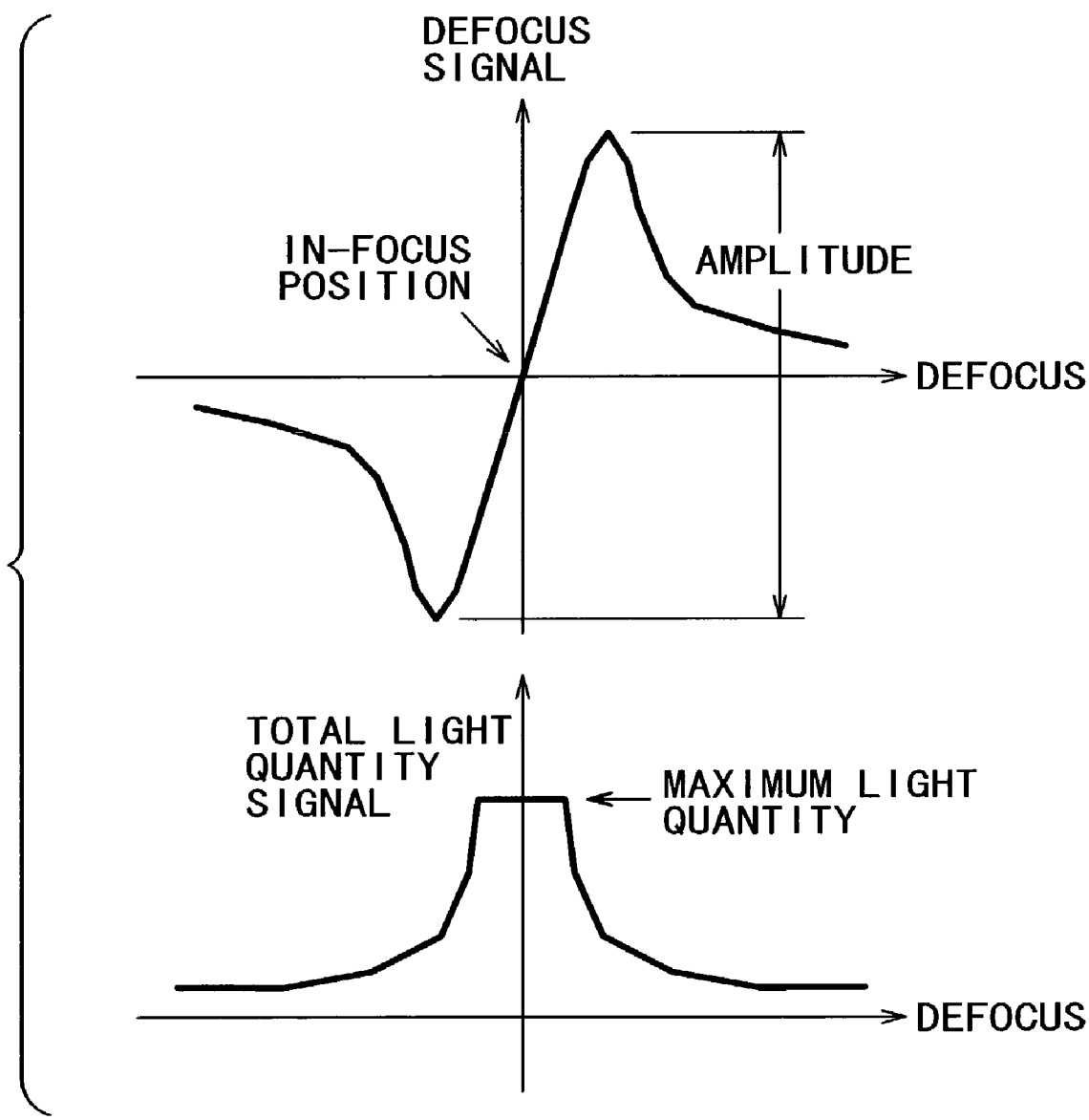

FIG. 35 is a view showing definitions for the defocus signal amplitude and for the maximum value of the total light quantity.

DETAILED DESCRIPTION OF THE PREFERRED EMBODIMENTS

Hereafter, embodiments according to the present invention will be described referring to the figures.

<Embodiment 1>

Figure 1:
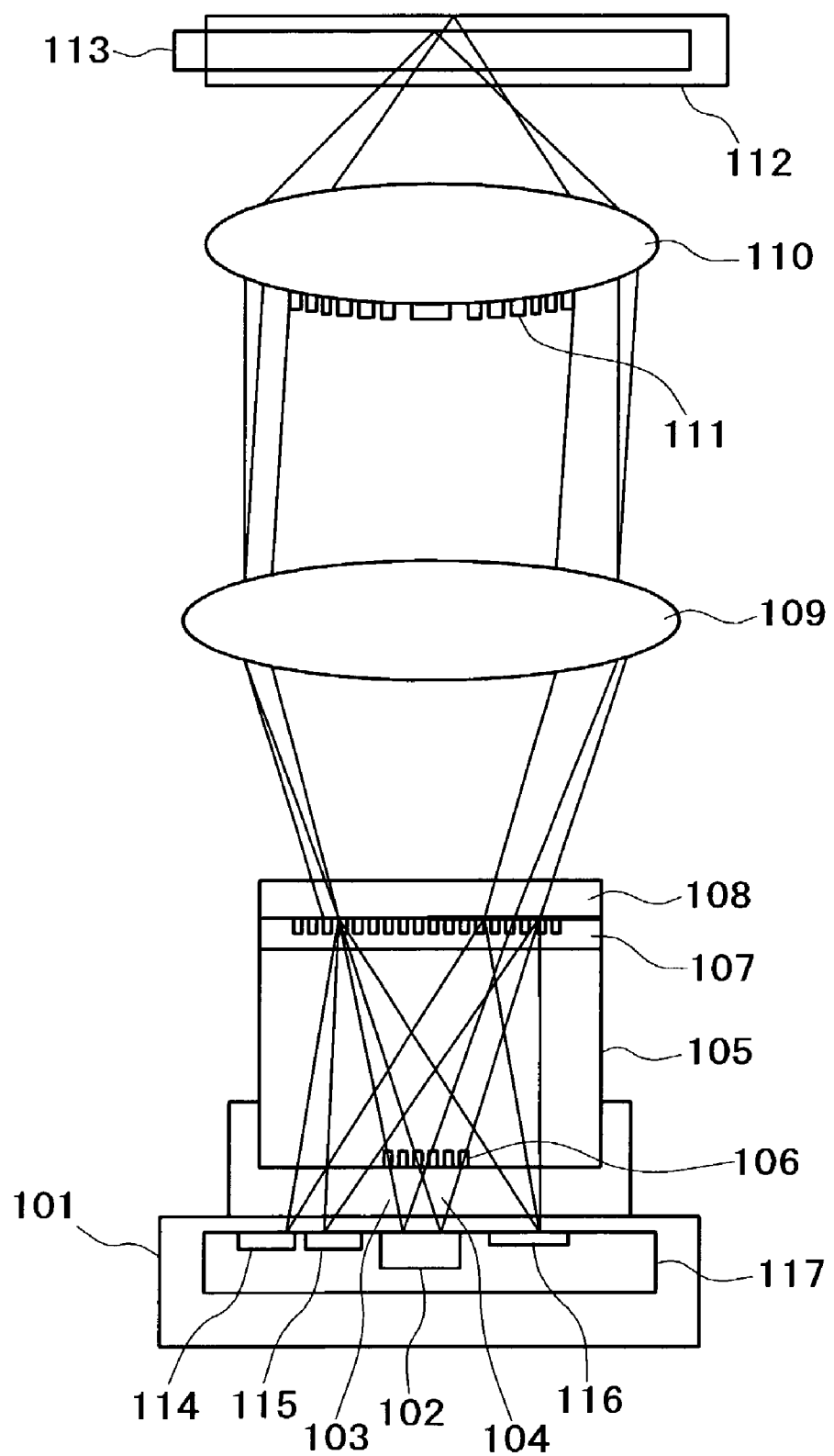
FIG. 1 is a view showing a basic embodiment of the optical reproducing apparatus according to the present invention.

FIG. 1 shows a fundamental embodiment of the optical reproducing apparatus according to the present invention. In a two-wavelength hologram laser module 101, infrared-laser light 103 and red laser light 104 are emitted from a two-wavelength semiconductor laser 102. In practice, although it is not necessary to emit these beams of light simultaneously and only one of tem that is necessary needs to be emitted, here the both beams of light are shown for the convenience of illustration. Each light enters a complex diffraction grating 106 formed on the diffraction grating substrate 105 and is divided into five beams, not shown in the figure, at each wavelength. Next, these beams of emitted light pass through the polarization-dependent diffraction grating 107, and are emitted from the two-wavelength hologram laser module 101 via a quarter-wave plate 108. At this time, the polarization-dependent diffraction grating 107 has been formed in such a way that polarization direction of the light entering the polarization-dependent diffraction grating 107 is in a direction in which the polarization-dependent diffraction grating 107 exerts no diffraction effect thereon. The light going out of the quarter-wave plate 108 is transformed into circularly polarized light, enters the collimator lens 109, and is then converted into a collimated beam. At this time, the collimated beams are such that one beam has an angle to the other beam, the angle being dependent on the spacing of the light emitting points of the two-wavelength semiconductor laser.

Next, these beams are focused on CD 112 and DVD 113 by the DVD/CD compatible objective lens 110, respectively. A multi-zone diffraction grating 111 is formed on the surface of the DVD/CD compatible objective lens 110. This has both a compensation effect for spherical aberration arising from the difference in thickness between DVD and CD and an effect as an aperture for limiting the numerical aperture (NA) of a CD focused spot of the infrared light to a value smaller than NA of DVD. Five beams of light divided by the complex diffraction grating form five focused spots on the disk, respectively, which have an effect in executing stable tracking control for various classifications of disks, as will be described later.

The five beams of light reflected by the disk reenter the objective lens, return the same optical path, and are converged toward the two-wavelength hologram laser module 101 by the collimator lens 109. The light of circular polarization is transformed into light of linear polarization whose polarization direction is rotated by 90 degrees from that of the initial outgoing laser light. Thereby, the beams of light are now diffracted by the polarization-dependent diffraction grating 107, are branched off from the optical path of the semiconductor laser to the collimator lens, and are focused on photodetectors 114, 115, 116.

Since, as described above, the light heading for the disk dose not suffer diffraction and only the reflected return light is subjected to the diffraction effect, unnecessary light is not produced and high utilization factor of light can be achieved; therefore the polarization-dependent diffraction grating is effective for a recording optical disk that requires high laser power. The polarization-dependent diffraction grating 107 is designed to have a grating pattern that provides not only light branching effect but also a specific effect that is effective to execute the focus detection. For example, if the polarization-dependent diffraction grating 107 is given a grating pattern for introducing astigmatism, as shown in FIG. 19, the focus detection by the astigmatic method can be executed. FIG. 19 is a calculated grating pattern of interference fringes between a planar wavefront and a synthetic wavefront in which astigmatism in a 45-degree direction to the horizontal direction of the figure (0 degree) and a phase distribution of a tilted wavefront for branching off the diffracted light to the right and left directions are combined. All that is then required is to place the grating so that the above-mentioned right and left directions agree with the radial direction of the disk. The photodetectors 114, 115 are both photodetectors used for the defocus detection and for the tracking error detection. The photodetector 114 is a photodetector for receiving the infrared light whose diffraction angle is large, and the photodetector 115 is a photodetector for receiving the red light whose diffraction angle is small. The two-wavelength semiconductor laser 102 and the photodetectors 114, 115, 116 are mounted on the same silicon substrate 117.

Figure 2:
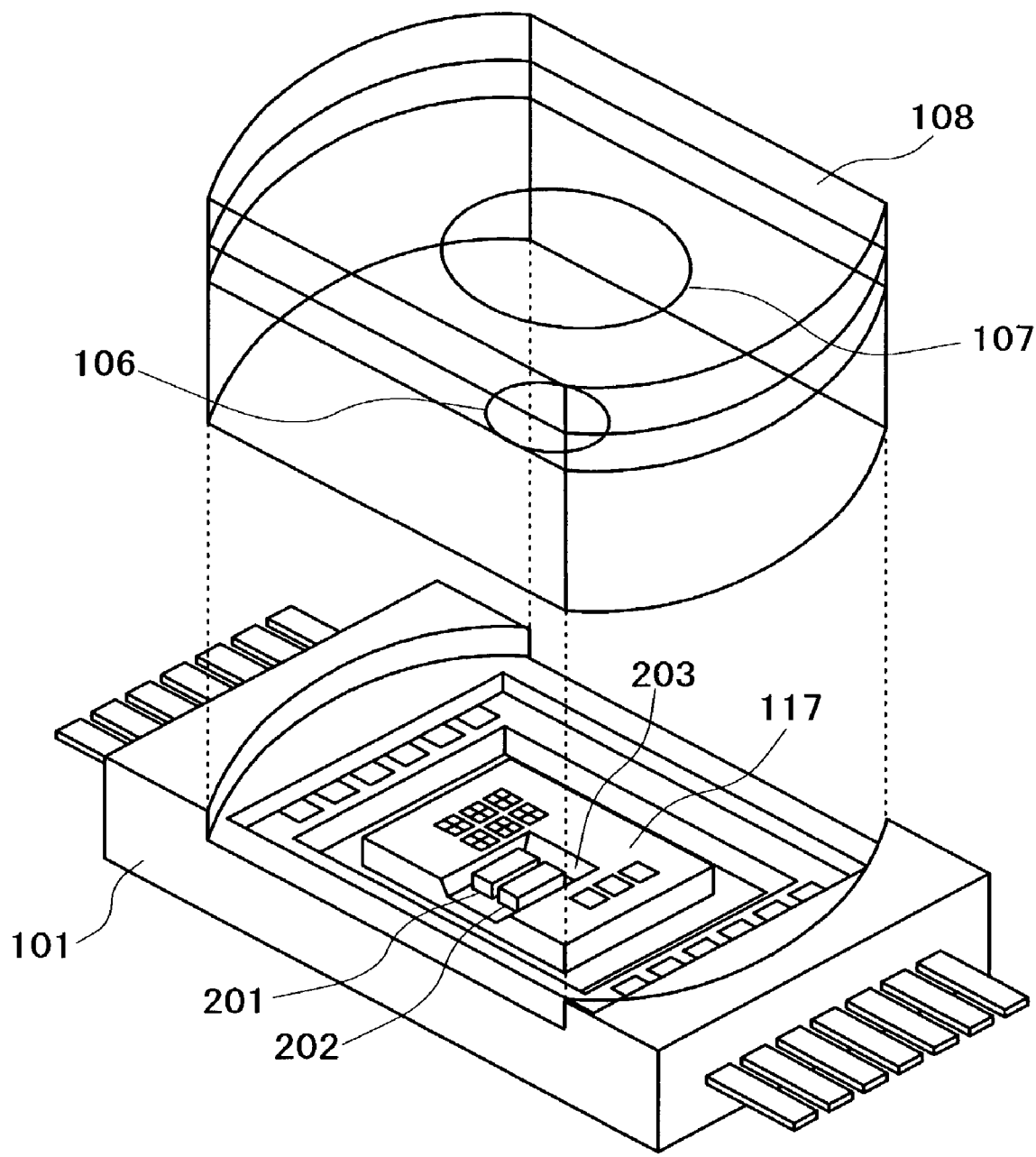
FIG. 2 is a configuration diagram of the two-wavelength hologram laser module 101 according to the present invention.

FIG. 2 is a configuration diagram of the two-wavelength hologram laser module 101 according to the present invention. In this embodiment, shown is an example where the infrared semiconductor laser 201 and the red semiconductor laser 202 are separately installed as constituents of the two-wavelength semiconductor laser. Each semiconductor laser is mounted on the silicon substrate 117, and outgoing light from an facet thereof is erected vertically by a reflecting mirror 203 formed on the silicon substrate 117. The complex diffraction grating 106, the polarization-dependent diffraction grating 107, and a quarter-wave plate 108 are integrated into one body, which is adhered to the laser module. At this step, in order to allow rotational adjustment of the hologram, peripheries of the joint planes to the laser module are machined to be circular. Both the complex diffraction grating 106 and the polarization-dependent diffraction grating 107 are shown in the figure only with the outlines indicating the grating areas for simplicity.

FIG. 3 is a view showing an example of arrangement of the semiconductor laser and the photodetectors on the silicon substrate of FIG. 2. Here, shown is an example where the two-wavelength semiconductor laser 102 takes a form of a single chip. The lasers fabricated in a single chip can narrow the spacing between light emitting points of the two wavelengths and can control the angles of view of the two wavelengths with respect to the objective lens to a small value. The larger the angle of view of light rays incident on the objective lens, the larger the spot size becomes because much aberration is introduced in the focused spot. The infrared laser light 103 and the red laser light 104 emitted from the two-wavelength semiconductor laser 102 are erected vertically by the 45-degree reflecting mirror 203 that was made by anisotropic etching on the silicon substrate 117. Alternatively, the same effect as the anisotropically etched mirror can be obtained by aligning and fixing a micro prism mirror made of a glass. The photodetectors 301–309 are formed around the two-wavelength semiconductor laser 102. The photodetectors 301, 302, 303 are photodetectors for the defocus detection and for the tracking error detection of the infrared laser light. On the other hand, the photodetectors 304, 305, 306 are photodetectors for the defocus detection and for the tracking error detection of the red laser light. In this embodiment, the focus detection by the astigmatic method and the tracking error detection by the differential push-pull method are assumed, and each light receiving part has a four-segment detection pattern in the form of a square window comprising four identical square panes of glass. Further, in order to receive the sub spots used for detecting the differential push-pull signals, 3 four-segment light detecting regions are necessary for each wavelength. Further, the photodetectors 307, 308, 309 are the photodetectors for receiving the diffracted light generated by the polarization-dependent diffraction grating at positions on the opposite side across the semiconductor laser from the side of the photodetectors 304, 305, 306. Regarding this side photodetectors, it is possible to make the red laser light and infrared laser light enter the same photodetectors by choosing a suitable diffraction angle of the polarization-dependent diffraction grating for a given spacing between the emitting points of the two-wavelength semiconductor laser 102. For this reason, in the example shown in the figure, there are only 3 light receiving parts on the right-hand side. Note here that the photodetectors 307, 309 are detecting regions for the sub spots and the photodetector 308 is a detecting region for the zero-order light. Since by outputting the output of the photodetector 308 as the RF signal the output of the single-segment light receiving part that is not divided contributes, as it is, to the reproduced signal, circuit noise caused by a current-voltage conversion amplifier can be reduced as compared with the case where the output is divided, is subjected to current-voltage conversion, and then added. For this reason, the signal detection with high S/N ratio becomes possible and this scheme will be also effective in enhancing the transfer speed in the future. The photodetectors 307, 309 are used in the case where the twin beam method is employed in the tracking of CD.

<Embodiment 2>

FIG. 4 is a table showing several methods for detecting the tracking error for plural classifications of disks. In the disk classification, RAM1 is the first generation of DVD-RAM (2.6 GB/side), RAM2 is the second generation of DVD-RAM (4.7 GB/side), and ROM-R/RW includes DVD-ROM, DVD-R, and DVD-RW, which are shown in a single column as a schematic representation because of equality of the guide groove pitch. Note here that the guide grove pitch means a distance between a center line of a given guide groove and a center line of a guide groove adjacent to this given guide groove. Among abbreviations in the field of the TR detection system, DPP denotes a Differential Push-Pull method and DPD denotes a Differential Phase Detection method. Oblong rectangles in the field of spot arrangement on the disk plane indicate guide grooves, showing relative difference in the pitch in each classification of disk. Further, five circles shown overlaid on the guide grooves show the arrangement of five sub spots according to the present invention.

As these five spots are not all required for each disk, it is desirable to detect the five spots independently, choose necessary spots for each disk, and perform signal calculation for the tracking. However, detecting all spots independently gives rise to problems such as: the number of the light receiving parts increases, the number of output pins of the photodetector increases, and the detector glows in size. On the other hand, among the five spots in FIG. 4, a spacing between the black circle spot and the gray circle spot arranged in a radial direction is narrower than the spacing between the white circle main spot and the above-mentioned spots; therefore the black circle spot and the gray circle spot cannot be separated in a space axis when being detected.

FIG. 20 shows a schematic diagram of the spots on the detectors. In order to separate the main spot and the sub spots surely on the detectors, these spots are arranged with a spacing of the order of 20–30 µm on the disk plane, whereas the spacing between the black circle spot and the gray circle spot is of the order of 1 µm on the disk plane. Since the imaging magnification on the detection plane for the objective lens focus is usually 5 to 6 times, the spacing between the black circle and the gray circle on the detector is 5 to 6 µm. On the other hand, the spot size on the detector is of the order of 60–70 µm under a just focus condition in the case of the astigmatic focus detecting method; therefore theses spots almost overlap each other on the detector and cannot be separated spatially. In the present invention, by the signal calculation of the differential push-pull tracking system, the influence of unnecessary spots is canceled out.

The differential push-pull method is a system in which the two sub spots are arranged, on the both sides of the main spot on the disk, at positions shifted therefrom in a radial direction by one-half the guide groove pitch of the disk, and the push-pull tracking error signals are detected simultaneously from the three spots in total. At this time, the tracking error signals of the two sub spots are added, the sum is multiplied so as to the same signal amplitude as the main spot, and then the sum so multiplied is subtracted from the tracking error signal of the main spot to obtain the tracking error signal. Since the tracking error of the spot over one period of the guide groove pitch generates the tracking error signal in the form of one sinusoidal waveform, the tracking error signal from the sub spot arranged at a distance of one-half the guide groove pitch from the main spot in a radial direction has a phase that is reversed by 180 degrees to the tracking error signal from the main spot obtained simultaneously. Since these signals from the sub spots are subtracted from the signal of the main spot, the tracking error signals are enhanced by each other. Note here that, when the objective lens moves in a radial direction in connection with the tracking operation, a DC-like offset occurs in the push-pull tracking error signal. This is because, when the reflected light from the disk is divided by a diameter lying in a tangential direction and portions thus divided are detected to perform the push-pull signal calculation, the dividing line is moved to the light. If the offset occurs, such a signal that should become zero naturally when the tracking error is zero does not become zero, and consequently the accurate tracking cannot be performed. Since the occurrence of the offset is added with the same sign to the above-mentioned tracking error signals of the main spot and of the sub spots whose phase are mutually reversed, they are canceled out when performing the calculation of difference. Thereby, the offset of the push-pull signal is removed and accurate tracking becomes possible even if the lens is moved. In order to detect the tracking error signal by the differential push-pull method with a single optical head for at least two classifications of disks one of whose guide groove pitches is almost two times larger than that of the other, the present invention employs one more set of sub spots in addition to the two sub spots. Therefore, five sub spots in total are used.

In the field "Ideal" of the field "Sub Spot Position" in FIG. 4, each of underlined figures indicates a relative position of the ideal sub spot in a radial direction with respect to the main spot, where "ideal" means being ideal when the differential push-pull method is applied to the disk concerned. Further, each of other figures not underlined indicates a position at which the influence of the sub spots that are inevitably necessary in achieving multi-disk compatible optical reproducing apparatus and are spatially inseparable on the photodetectors can be canceled out by the calculation of the differential push-pull method.

For example, a relative position of the sub spot in a radial direction that is required in applying the differential push-pull method for the first-generation DVD-RAM (RAM1) is one-half the guide groove pitch, namely 0.74 µm. This sub spots are shown by the black circle in the figure. On the other hand, the sub spots that are used for the DVD-RW etc. but are originally unnecessary for DVD-RAM are shown by the gray circles in the figure. When these spots are located one-quarter the guide groove pitch, i.e. 0.37 µm, away from the main spot in a radial direction, the spacing between the two sub spots becomes 0.74 µm and the phases of the push-pull signals from these unnecessary sub spots are exactly opposite to each other. Therefore, the influence of these unnecessary sub spots can be cancelled out when the push-pull signals are first added in order to perform the calculation of the differential push-pull method. Although the second-generation DVD-RAM (RAM2) differs from RAM1 in that the guide groove pitch is 1.23 µm, narrower than that of RAM1, it stands similarly with the above-mentioned RAM1 that an ideal position of the sub-spot used in the differential push-pull method is a position at a distance of one-half the guide groove pitch from the main spot in a radial direction and the influences thereof can be canceled out if the unnecessary sub spots are located one-quarter the guide groove pitch away from the main spot in a radial direction.

Further, since the guide groove pitch is 0.74 µm for DVD-R/RW, the ideal position of the sub spot necessary to perform the calculation of the differential push-pull method is 0.37 µm. Therefore, now the gray circle takes an ideal position, and this spot yields the push-pull signal whose polarity is reversed to the push-pull signal of the main spot. At this time, if the sub spots that are necessary for DVD-RAM but are unnecessary for DVD-R/RW are located 0.74 µm away from the main spot in a radial direction, namely at positions of the black circles, these spots yield the push-pull signal whose polarity is the same as the main spot because these spots are located exactly one guide groove pitch away from the main spot in a radial direction. Accordingly, the push-pull signals of the black-circle sub spot and of the gray-circle sub spot are just reversed in polarity, and by adding the signals of two kinds of sub spots, the push-pull signals are canceled out to leave only the offset. Therefore, after all when the normal calculation of the differential push-pull method is performed, only the offset is subtracted from the push-pull signal of the main spot that involves the offset, and thus the accurate tracking error signal can be obtained. That is, at a stage when the push-pull signals of the black circle spots and the push-pull signals of the gray circles are all added, the tracking error signal are all canceled out to leave only the offset, and when the differential calculation is performed with the main spot, only the offset is removed from the signal of the main spot. Note here that for DVD-ROM, as already explained, since the optical depth of the pit is ¼ wavelength, the push-pull signal can hardly be obtained theoretically. Therefore, the differential phase detection method that has been used conventionally is employed. This can be obtained by receiving the main spot with the four-segment detector. Further, also for DVD-R/RW, since they are made such as can be reproduced by a reproduction-only apparatus fundamentally as DVD-ROM after the data are recorded therein, it is possible to perform the tracking by the differential phase detection method. However, since the disk lacks pits at the time of recording that are requisite for the tracking by the differential phase detection method, it is necessary to employ the differential push-pull method.

Further, regarding CD, there can be considered both possibility of applying the differential push-pull method and possibility of applying the twin beam system. In the case where the differential push-pull method is applied, as is clear from the figure, the same consideration as that of the above-mentioned DVD-RAM is applicable. On the other hand, in the twin beam system, since the sub-spot positions at a distance of one-quarter the guide groove pitch from the main spot in a radial direction are optimal, it is necessary to remove the influence of the sub spots located an exactly double of that distance away from the main spot in a radial direction. Since unnecessary sub spots are located one-half the guide groove pitch from the main spot in a radial direction, they provide signals whose polarities are reversed to the signal from the main beam. This stands similarly for the sub spots on the both sides of the main beam. Therefore, in the calculation of the twin beam system where the total light quantities of the two sub spots undergo subtraction, the influence of the two unnecessary sub spots both of which give a reverse-sign signal to that of the main beam are canceled out mutually. That is, when the tracking error signal of the twin beam method is obtained by taking a sum of the upper black circle and gray circle spots and a sum of the lower black circle and gray circle spots, among four sub spots in FIG. 4, and then taking the difference between these sums, since the relative positions of the two black circle spots to the guide groove are equivalent, they are canceled out mutually. Further, for CD-ROM, although the optical depth of the pit is somewhat shallower than ¼ wavelength as already stated, it is also possible to apply the differential phase detection method. In this case, in the same manner as of DVD-ROM, the tracking error signal can be obtained by receiving the main beam with the four-segment photodetector. For CD-R/RW, since it is a precondition that at the time of reproducing they can be reproduced basically by the reproduction-only apparatus equally with CD-ROM, it is possible to apply the twin beam method, the differential push-pull method, and the differential phase detection method to CD-R/RW similarly with CD-ROM. At the time of recording, since CD-R/RW are in a stage of lacking the pits, it is necessary to employ the differential push-pull method by the guide groove.

In the above viewpoint, positions of the necessary sub spots and of the unnecessary sub spots, both of which are ideal, are found, and averages of these values, 0.68 μm and 0.34 μm are determined for two kinds of sub spot positions for the red laser, respectively. They are shown in the field of "This Invention" of the "Sub Spot Position." In this situation, the sub-spot positions when the infrared laser light is entered into the diffraction grating wherewith the sub spots at these positions are realized by the red laser light are found to be 0.82 μm and 0.41 μm, respectively, according to a ratio of the wavelengths in concern. How much the effect will be reduced when these values deviate from the ideal values is confirmed by scalar diffraction simulation as will be described later.

Here, regarding the focus detecting method, not so much description has been given thus far. As a task to be solves that has been pointed out from old time, there is a problem of disturbance that occurs in the defocus signal when the light spot traverses the guide groove while executing the focus control at the time of address seeking etc. Also for this, it is necessary to choose a method suitable for a shape of the guide groove of the disk. In this embodiment, a disturbance canceling type astigmatic method is used. The astigmatic method is a method that is generally susceptible to disturbances. However, if this method is combined with the differential push-pull method, the disturbance can be canceled out by adding a defocus signal obtained from the sub spots by the astigmatic method to the above-mentioned defocus signal. The effect of reducing the disturbance by this combination has also been confirmed by the scalar diffraction simulation. Further, the defocus detection system is not limited specially to the astigmatic system, and it is also possible to employ the spot-size detecting method and the knife edge method instead.

Figure 5:
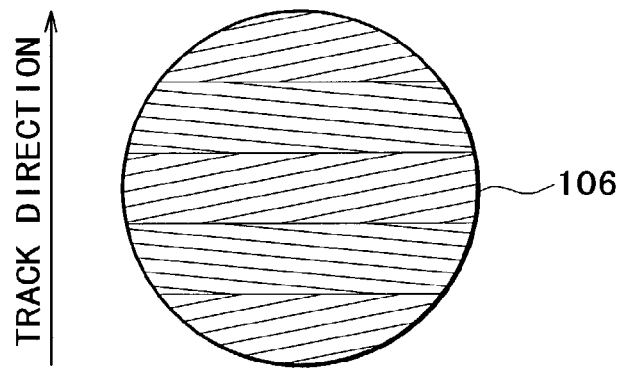
FIG. 5 is an illustration of the complex diffraction grating.

FIG. 5 is a view showing an example of the pattern of the complex diffraction grating 106 for achieving the effect as described above. In the pattern, a region for forming sub spots suitable for the differential push-pull method in the DVD-RAM and a region for forming sub spots suitable for the same in DVD-R/RW are set alternately, each in a zonal shape to the light. Boundaries of the regions are set parallel to a radial direction of the disk so that the push-pull signals can be obtained even with zonal regions.

Figure 6:
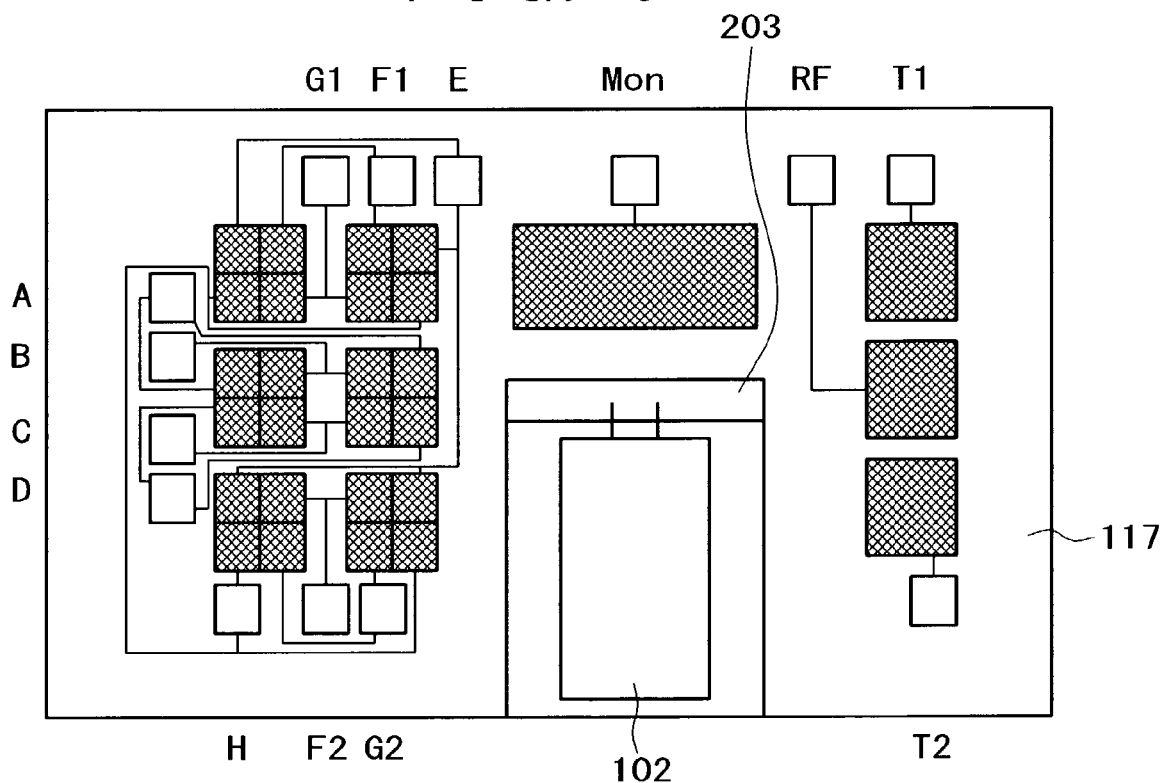
FIG. 6 is a view showing the light receiving parts, wiring pattern starting from them, and a method for calculating signals etc.
Figure 7:
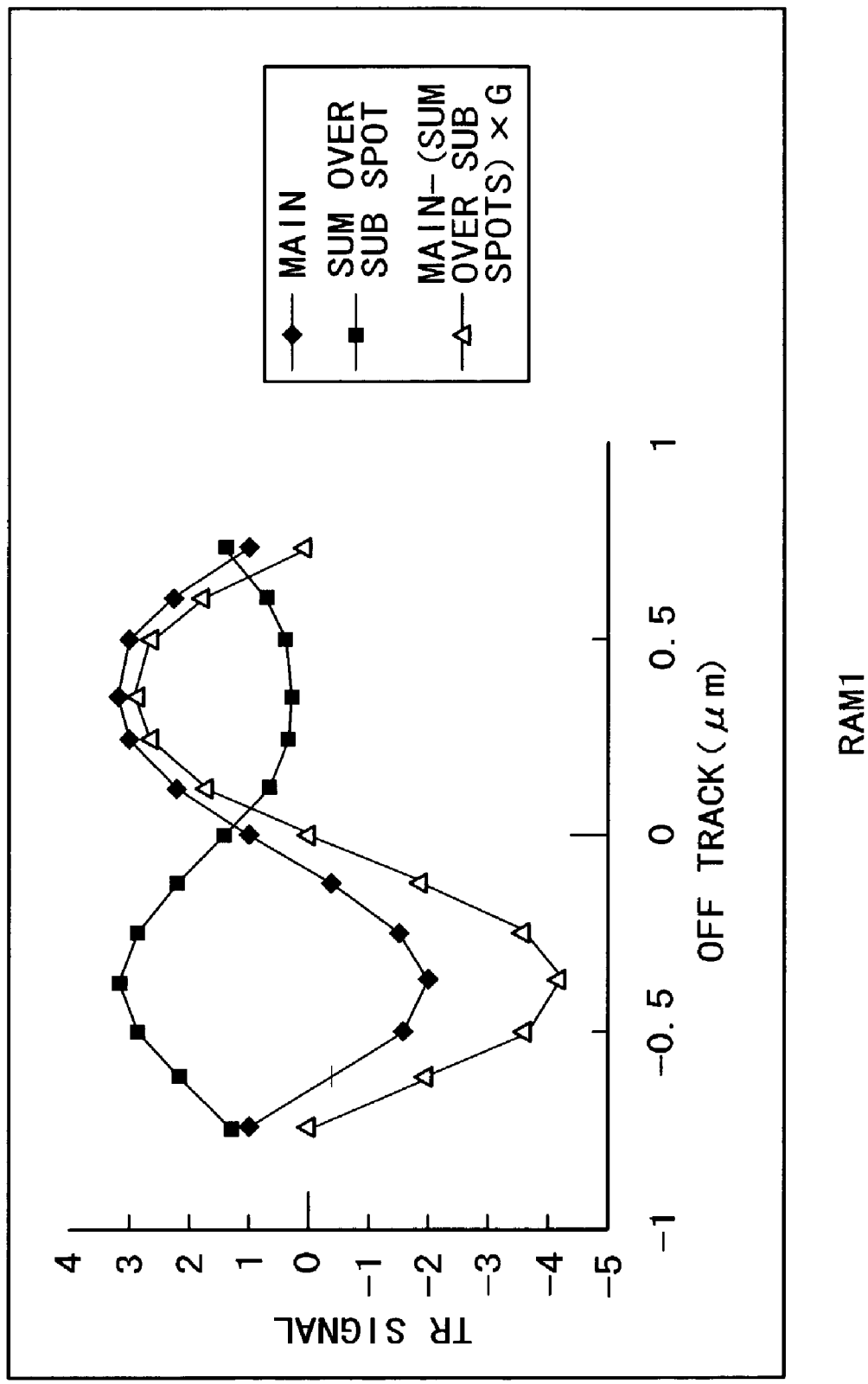
FIG. 7 is a graph showing the occurrence of the tracking error signal offset of the main beam for a lens shift of 300 µm and the results of simulation to confirm the effect of offset reduction by the present invention (DVD-RAM1)
Figure 8:
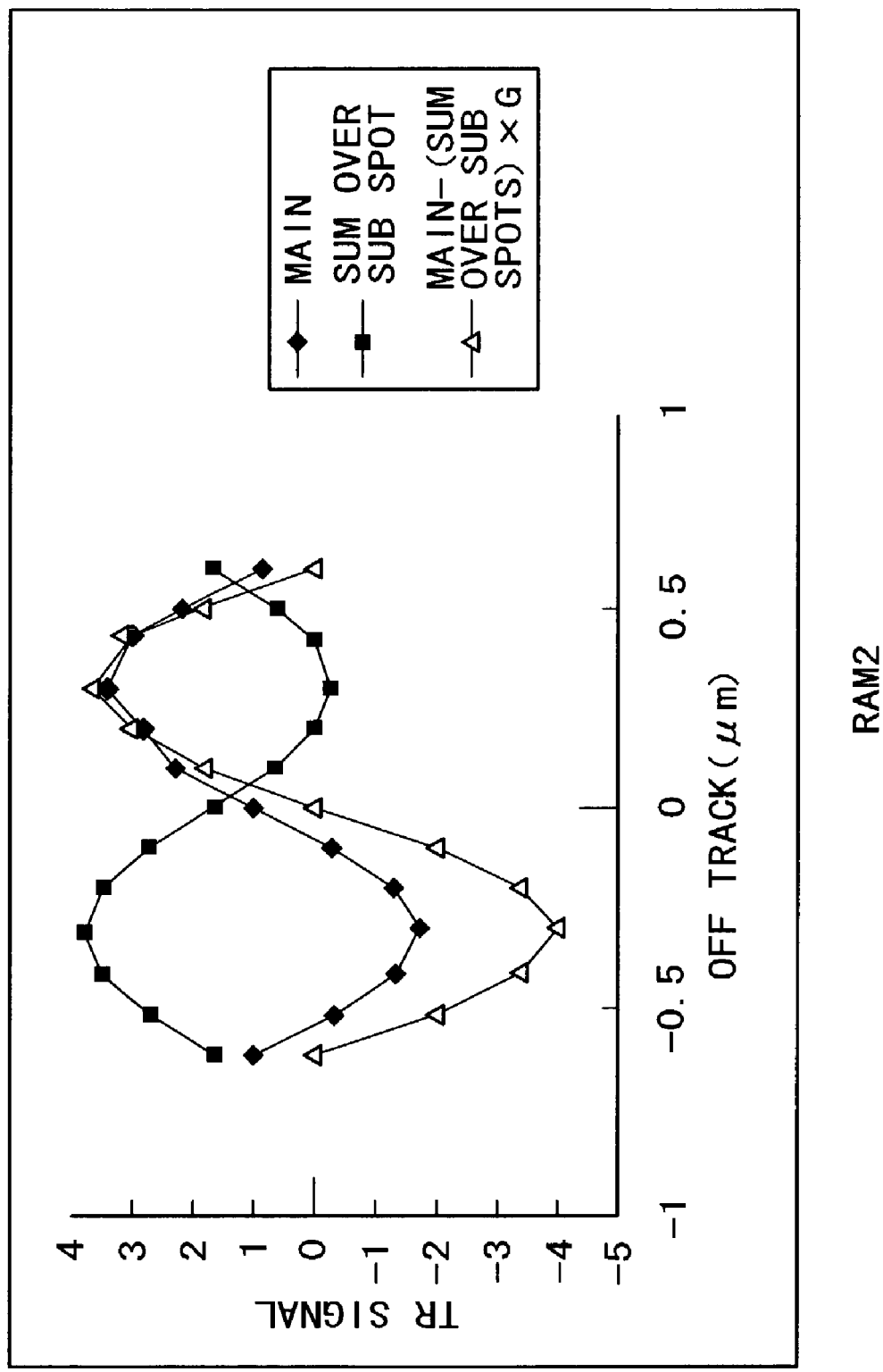
FIG. 8 is a graph showing the occurrence of the tracking error signal offset of the main beam for a lens shift of 300 µm and the results of simulation to confirm the effect of offset reduction by the present invention (DVD-RAM2)
Figure 9:
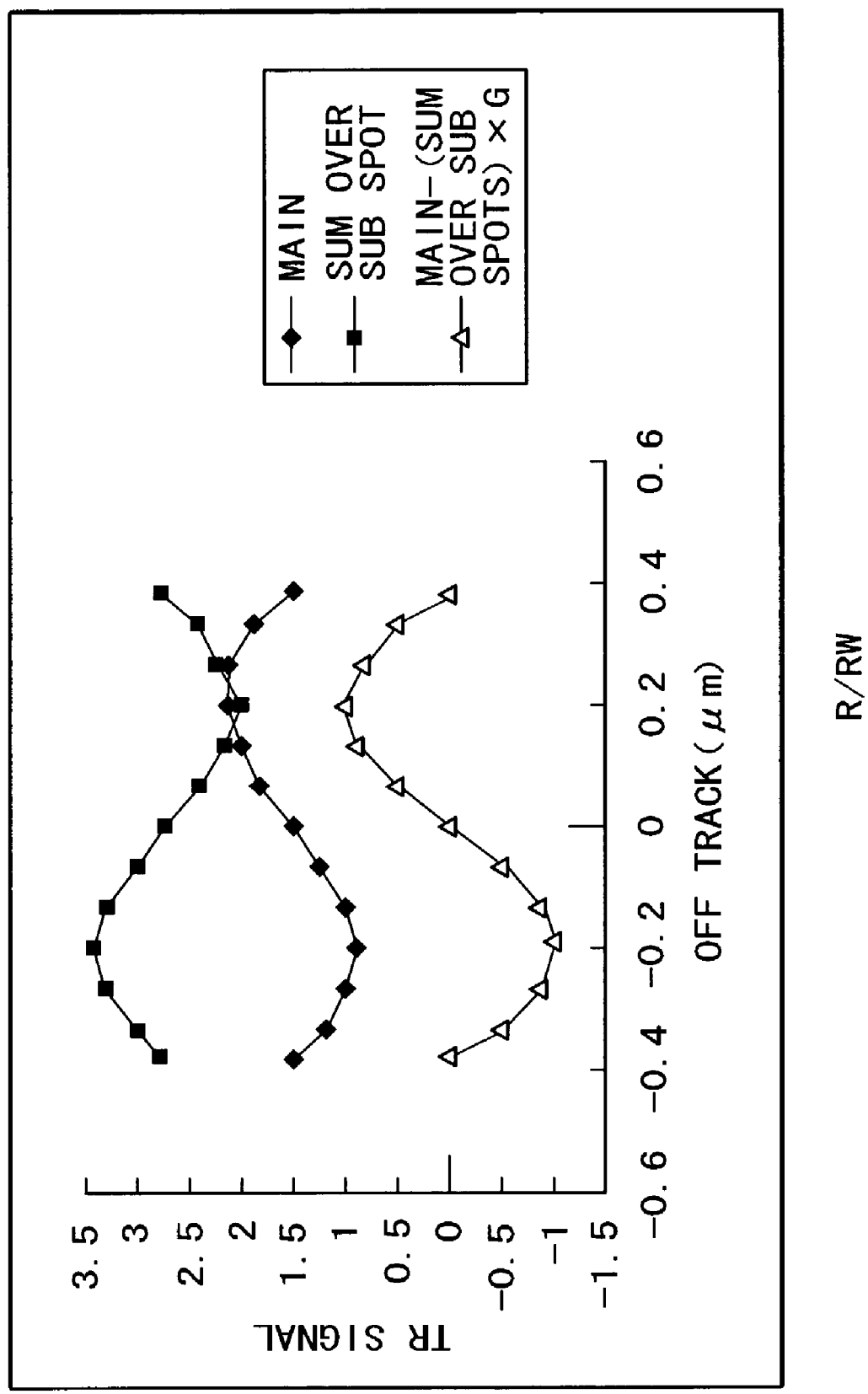
FIG. 9 is a graph showing the occurrence of the tracking error signal offset of the main beam for a lens shift of 300 µm and the results of simulation to confirm the effect of offset reduction by the present invention (DVD-R/RW)
Figure 10:
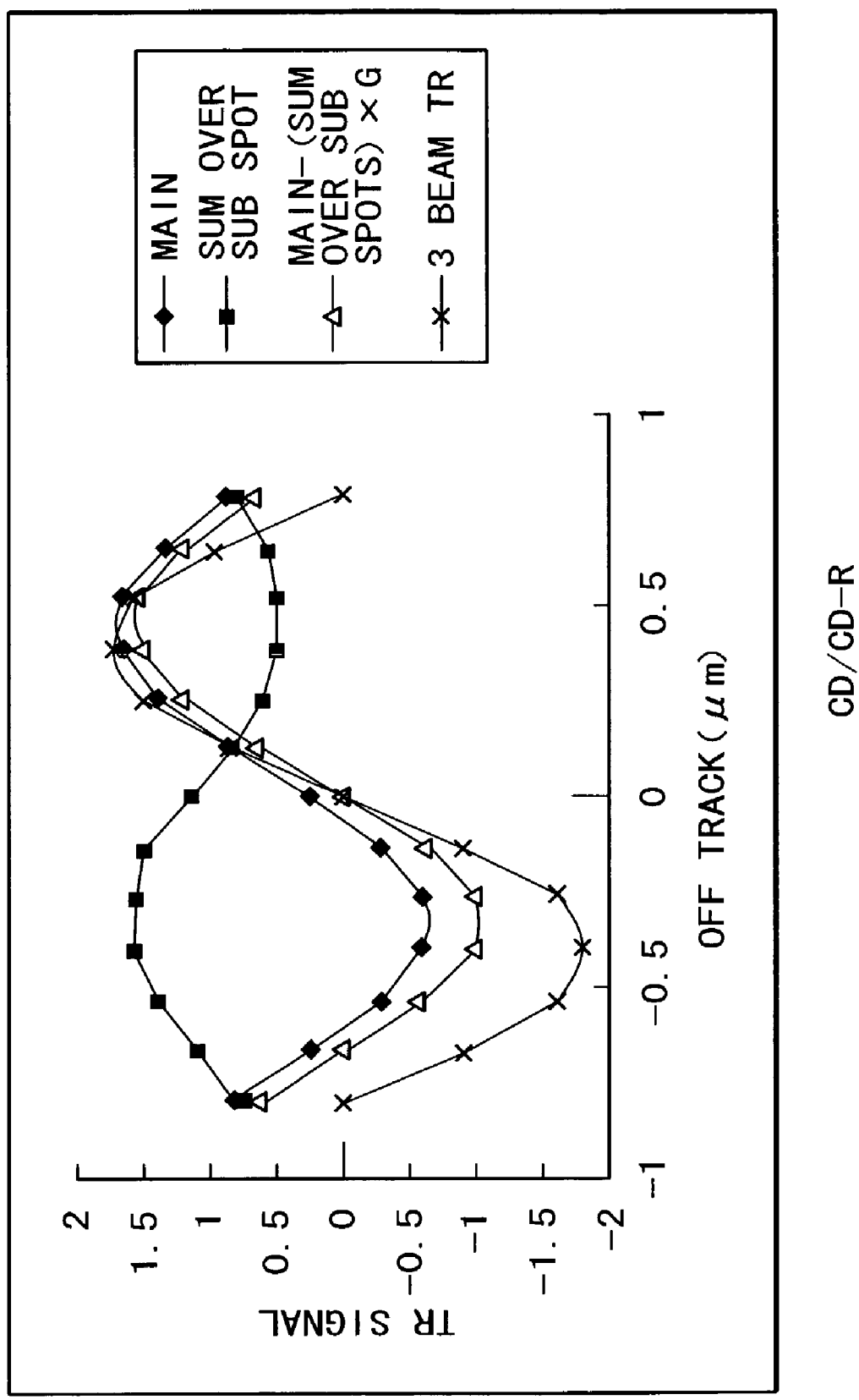
FIG. 10 is a graph showing the occurrence of the tracking error signal offset of the main beam for a lens shift of 300

FIG. 6 shows the light receiving regions, a pattern of wiring from the regions, and a signal calculating method. This figure is a top view for the example of arrangement in FIG. 3, basically showing in detail the wiring on the top side. An etched mirror 203 is formed by anisotropic etching on the silicon substrate 117 and thereby outgoing light from the two-wavelength semiconductor laser 102 is erected in a direction perpendicular to a plane of the drawing. Hatched regions represent the light receiving parts and white open squares are pads for wire bonding. Two columns of 3 four-segment detecting regions that are aligned vertically on the left of the figure are defocus signal and tracking error signal detecting light receiving parts (left-hand column for the infrared light and the right-hand column for the red light); among 3 light receiving parts that are aligned vertically on the right of the figure, a middle light receiving part is the photodetector for the reproduced signal, and upper and lower light receiving parts thereof are the photodetectors for detecting the sub beams by the twin beam method; and an oblong light receiving part above the lasers 203 is the light receiving part for detecting monitor light. To obtain the monitor light, the reflected light from the optical disk is not received, but the light that was erected vertically by the 45-degree etched mirror and was reflected by the hologram surface etc. is detected as a light-quantity monitoring signal of the outgoing light. To reduce the number of output signal wires of the light receiving parts, the light receiving part for the red laser light and the corresponding light receiving part for the infrared laser light are connected each other. However, in this embodiment, in order to make the connection easy, the left region of the four-segment light receiving regions for the red laser light and the right region of those for the infrared laser light are connected, and vice versa. Consequently, this manner of connection does not impinge upon the tracking error signals wherein the polarity is reversed between the upper light receiving region and the lower light receiving region; however in the defocus signals wherein the polarity is reversed between the right and left adjacent regions, the polarity of the detected signal variation for the defocus becomes opposite between the case where the light is the red laser light and the case where it is the infrared laser light. Therefore, in executing the focus servo, it is necessary to switch either of the defocus signals reversely so that both signals are of the same polarity. Reference letters A, B, C, D, E, F1, F2, G1, G2, H, Mon, RF, T1, and T2 shown around the light receiving parts are names of the signal wires, and they are used to represent signal calculation formulas in the bottom of the figure. In the calculation of "DPD," the calculation of "Phase ( )" is defined as a function corresponding to a phase in a time direction of the signal. If one wishes to reduce the number of the output signal wires further from this state, all that is required is that dummy bonding pads are provided in the substrate, the terminals that can be connected each other via the pads are connected so, wire boding is done from those pads to terminals outside the substrate (not shown in the figure). If the number of signal wires is minimized in this way, by connecting the corresponding terminals between the light receiving parts for the red light and the light receiving parts for the infrared light and between the light receiving part for the (+) first-order diffracted light and the light receiving part for the (−) first-order diffracted light, the number of signal wires can be reduced to eleven in total with the following break down: eight wires for the defocus (AF) and differential push-pull tracking detection system (DPP); two wires for the twin beam tracking detection system (TB); and one wire for the RF system. In principle, among 3 four-segment light receiving parts that are aligned vertically, the upper and lower light receiving regions for detecting the sub beams are such that the received signals are basically equivalent to each other, and hence these regions can be connected with each other before hand. Therefore, the outputs of the main beam count four and the outputs of the sub beams count four, counting eight in total. For the outputs of the twin beam, the number of output wires becomes two because the division of the sub beams is unnecessary. With respect to the RF signal, since the output of the single-segment photodetector that is not divided contributes, as it is, to the reproduced signal, the circuit noise caused by the current-voltage conversion amplifier can be reduced as compared with the case where the output is divided, is subjected to current-voltage conversion, and then added.

FIGS. 7, 8, 9, and 10 show calculation results of the main-spot push-pull signal (graph explanatory note: Main), the sub-spot push-pull signal (graph explanatory note: Sum over Sub Spots), and the difference between the above signals (differential push-pull) (graph explanatory note: Main−(Sum over Sub Spots)×G) under addition of a lens shift of 300 μm for four classifications of disks in the system shown in FIGS. 4, 5, 6 by simulation in order to confirm the effect of reducing the off set in the tracking error signal caused by the lens shift. In any disk, it was proved that the offset was canceled out by the differential push-pull method. However, for CD, although the offset was canceled out in the case of differential push-pull method, symmetry of the signal is not so excellent, and the signal by the twin beam method (graph explanatory note: 3 beam TR), which was calculated simultaneously, has better symmetry.

On the other hand, FIGS. 11, 12, 13, 14 show calculation results of the influence of the disturbance caused by the guide groove upon the defocus signal when there is astigmatism of 0.2λ in a 45-degree direction in the conventional astigmatic defocus detection system. The horizontal axis denotes the defocus of the spot on the disk and the vertical axis denotes the defocus signal. Calculation was performed while the displacement of the spot to the track is varied four times at equal intervals in one period of the guide groove. A shift in each defocus signal corresponds to the disturbance. It can be seen that the disturbance occurs in any classification of disk.

FIGS. 15, 16, 17, 18 are the results of addition of the defocus signals of the sub spots by the differential push-pull method under the same conditions as those of FIG. 11 through FIG. 14. The results indicate that the disturbance observed in FIG. 11 through FIG. 14 has been canceled out.

<Embodiment 3>

FIG. 21 shows another embodiment of the complex diffraction grating 106 to be used in FIG. 1 and FIG. 2. In this embodiment, in order to form five sub spots on the disk plane, a grating 2101 whose phase is shifted periodically is used. In the figure, hatched zonal regions designate regions in which protrusions/depressions and/or lightness/darkness of the grating vary. The degree of the phase shift of the grating is defined to be 180 degrees when the phase of one unit grating is shifted to the adjacent unit grating by one-half the grating period. The figure shows a phase shift of almost 180 degrees, but optimal values of the phase will be identified later in FIG. 23. Representing a diameter of the light flux corresponding to an effective diameter of the objective lens at the position of the grating by D, the wavelength by λ, the spacing of the two adjacent sub spots on the disk by p, and the numerical aperture of the objective lens by NA; the width of a region in which the grating phase is uniform is given by Dλ/(2pNA). Such periodical phase change of the grating has an influence only on the sub beams and not on the main beam. The reason that the sub spot is divided into two spots by a grating like this is that the light flux constituting the sub spot is added with a phase shift equal to the phase change of the grating. That is, portions of the light having different phases interfere with each other, and consequently the light quantity of the central part becomes zero and the sub spot is divided into the two spots.

FIG. 22A and FIG. 22B show the spot arrangement on the disk plane when such a grating is used. FIG. 22A is for DVD-R/RW, and FIG. 22B is for DVD-RAM (RAM1). The both cases are such that the same spot arrangement as those in FIG. 4 is intended to be achieved.

FIG. 23 shows the sub-spot distributions calculated with varying phase shift of the grating. The calculation was performed for a wavelength of 650 nm, a NA of 0.65, and a sub-spot spacing of 1 μm. From the calculation, the phase shift of 60 degrees, 160 degrees, or their vicinities is excellent for the intended sub-spot arrangement.

FIG. 24 is a view showing arrangement of the main spot and the sub spots in this phase shift. Two sets of the two sub spots are arranged on the both sides of the main beam.

<Embodiment 4>

FIG. 25 is an embodiment of the diffraction grating 2401 for producing second-order diffracted light that is used instead of the complex diffraction grating. In order for the diffraction grating to produce second-order diffracted light, all that is required is that the width w of the unit grating is smaller than or larger than one-half the grating pitch p.

FIG. 26A and FIG. 26B are views showing arrangement of the focused spots on the disk plane in the case of using the diffraction grating 2401 for producing second-order diffracted light. FIG. 26A is for DVD-R/RW, and FIG. 26B is for DVD-RAM. The five spots are aligned on a straight line. Among them, beams of the (±) first-order diffracted light yield sub spots wherewith the differential push-pull signal detection is performed for DVD-R/RW, and beams of (±)

second-order diffracted light yield sub spots wherewith the differential push-pull signal detection is performed for DVD-RAM.

FIG. 27 is a view showing the photodetectors on the laser module and wiring connection when the diffraction grating 2401 for producing second-order diffracted light is used. The light receiving regions are hatched, and open squares represent the bonding pads. The reference letters A1, A2, A3, A4, B1, B2, B3, B4, C1, C2, C3, C4, D1, D2, D3, D4, etc. outside of the leftmost of the laser module in the figure are names of signal wires for outputting signals. Using these letters, the signal calculation is performed as shown in the bottom of the figure. Since, by this arrangement, two kinds of sub spots can be separated and the sub spots suitable for each of the two classifications of disks can be detected separately; for both the defocus signal and the tracking error signal, the zero-order light and the (±) first-order diffracted light are chosen for DVD-RW, and the zero-order light and the (±) second-order diffracted light are chosen for DVD-RAM. Thereby, optimal differential push-pull calculation can be performed for each disk. The photodetectors on the right of the figure is an embodiment where the zero-order light is received for the RF signal and beams of the (±) first-order light are received to perform the twin beam detection for CD. However, since this method requires considerably large number of signal wires, the device tends to become large, to which one should pay attention in designing the apparatus.

<Embodiment 5>

Next, an embodiment in the case where the spot-size detecting method is employed for the defocus signal in the optical head and the laser module of FIG. 1 and FIG. 2 will be described. Although this spot-size detecting method requires larger number of light receiving parts than the case where the astigmatic method is employed, the disturbance that is generated when the light spot traverses the guide groove is not so large as is the case of the astigmatic method already mentioned; therefor this method can be applied to any of RAM1, RAM2, ROM, DVD-R, DVD-RW, CD, and CD-R without executing special cancellation of the disturbance.

FIG. 28 is a view showing an embodiment of the polarization-dependent diffraction grating. In this embodiment, basically the converging state of the (±) first-order diffracted light is caused to change by the grating in mutually reverse directions, namely to more converging and to less converging, both getting away from the converging state of the zero-order light, which introduces such an effect to the diffracted light that, when the focused spot on the disk plane is subjected to defocus, the sizes of the detected spots on the photodetectors vary asymmetrically. By employing this effect, the defocus detection is performed. A grating pattern of the polarization-dependent diffraction grating 2801 is composed of four regions, and this pattern is such that the upper right quadrant and the lower left quadrant in the figure give the diffracted light a lens effect whose signs are the same, whereas the upper right quadrant and the lower left quadrant give the diffracted light a lens effect whose signs are the same but opposite to the above-mentioned signs. That is, if the upper right quadrant and the lower left quadrant are set to modify the diffraction grating so as to give the diffracted light more convergence, the upper left quadrant and the lower right quadrant are set to modify the diffraction grating so as to give the diffracted light less convergence; so that these beams of light have different foci.

FIG. 29 is a view showing a photodetector pattern of the laser module (i.e., arrangement of the photodetectors in the laser module) and a wiring diagram. The hatched regions are light receiving parts and open squares represent the bonding pads. A 45-degree reflecting mirror 203 is built into the silicon substrate 2901 by anisotropic etching, and an infrared semiconductor laser chip 2902 and a red semiconductor laser chip 2903 are mounted thereon in front of the mirror 203. Note here that the reason that the two semiconductor laser chips are independent is that, since the spot-size detecting method suffers less influence of wavelength shift on the defocus detection than the astigmatic detection method, the spacing between the light emitting points can be widened. By virtue of this advantage, each semiconductor laser chip may be fabricated for each wavelength and be mounted thereon after fabrication, and consequently the yield is increased as compared with the case where a monolithically integrated two-wavelength laser chip is used. Among photodetectors, those arranged on the left of the etched mirror are photodetectors for the defocus detection and for the tracking error signal detection, and those arranged on the right of the etched mirror are photodetectors for detecting the reproduced signal and for the tracking error signal detection by the twin beam method. Further among the left-hand side photodetectors, those on two columns close to the mirror are the photodetectors for red semiconductor laser lights, and those on two column away from the mirror are the photodetectors for infrared semiconductor laser. Among each of the above-mentioned sets of the two columns, the photodetectors of the right-hand side column of the two column have light receiving regions each for receiving light diffracted by the upper right quadrant and the lower left quadrant of the polarization-dependent diffraction grating 2901 of FIG. 29; and the photodetectors of the left-hand side column of the two column have light receiving regions each for receiving light diffracted by the upper left quadrant and the lower right quadrant of the polarization-dependent diffraction grating 2901. In the figure, received light fluxes on the respective photodetectors when the spot on the disk plane is in an in-focus state are illustrated with butterfly-shaped patterns. If the spot on the disk suffers defocus, the received light fluxes on the right-hand detectors and those on the left-hand detectors change their spot sizes in mutually-reverse directions, wherein those directions depend on the direction of defocusing. FIG. 30 shows how the spot change and how the received light signal varies in response to the defocus. That is, for example, when the spot is in a front focus state and hence the spot 3004 on the left-hand segmented detector 3001 becomes smaller, the spot 3005 on the right-hand segmented detector 3002 becomes larger. Each detector is divided into three segments, i.e., an upper segment, a middle segment, and a lower segment. The upper and lower segments in the left-hand detector are wired to the middle segment of the right-hand detector, and the middle segment of the left-hand detector is wired to the upper and lower segments of the right-hand detector. By this arrangement, an output signal of the differential amplifier 3003 becomes positive. When the focusing is in the in-focus state, input signals to the differential amplifier 3003 are balanced and hence the output signal becomes zero. When the spot becomes in a rear focus state, the light exhibits defocusing in a reverse manner to the case of the front focus state: the right-hand spot becomes smaller and the left-hand spot becomes larger. Therefore, the output signal of the differential amplifier becomes negative. Thus, the defocus can be detected by knowing the change in the spot sizes.

On the other hand, for the zero-order light, the tracking error signal is obtained from the difference between the outputs from the upper and lower segments of the three-segment light receiving part in FIG. 29. Further, for the (±) first-order light, each beam of the (±) zero-order light is received by the two-segment light detecting region formed by dividing a detecting region to upper and lower segments. Each of the tracking error signals is obtained from the difference signal between the upper and lower segments similarly. Originally the tracking error signal can be obtained by detecting imbalance between the light quantities of the received light fluxes on the both sides in the disk radial direction. In this embodiment, since the light is divided to two butterfly-shaped fluxes as shown in the figure wherein one of the two fluxes is in the front focus state and the other flux is in the rear focus state on the detector pane, the push-pull signal can be obtained from a differential signal between upper and lower segment outputs. Therefore, the differential push-pull signal is obtained from a difference between the push-pull signals.

<Embodiment 6>

Next, an embodiment in which the present invention is used in an optical system not using the laser module will be described.

FIG. 31 shows a model view of the optical system. The light from a red semiconductor laser 3001 passes through the complex diffraction grating 3003, is reflected by a beam splitter 3005, passes though a dichoric prism 3006, is converted to collimated light by a collimator lens 3007, is reflected by the erecting mirror 3008, and is focused on the DVD 3010 by an objective lens 3009. The reflected light returns the same optical path until the beam splitter 3005, passes therethrough, and is received by a photodetector 3012. On the other hand, light from an infrared semiconductor laser 3002 passes through the complex diffraction grating 3004, is reflected by the dichoric prism 3006, is collimated to a collimated beam by the collimator lens 3007, and is reflected by the erecting mirror 3008, and is focused on a CD 3011 by the objective lens 3009. The reflected light returns the same optical path to the dichoric prism 3006, passes there through, passes through the beam splitter 3005, and is received by a photodetector 3012. Since, when the received light fluxes in a converging state pass through the beam splitter 3005, the astigmatism occurs for both fluxes, this astigmatism is used to perform the focus detection by the astigmatic method. For the complex diffraction gratings 3003 and 3004, either of the complex diffraction grating 2101 of FIG. 5 or the complex diffraction gratings 2101 of FIG. 21 maybe used, respectively. Since each constituent can be used as only for each wavelength, each grating pitch can be optimized so that the light receiving part can be shared on the photodetector 3012.

FIG. 32 shows patterns of the light detecting regions of the photodetectors, signal outputs, and explains how the signal calculation is performed with formulas. 3 four-segment detecting regions each of which is in the form of a square window comprising four identical square panes of glass are arranged along a tangential direction so as to receive three spots. As already stated, each light receiving part is shared by the red semiconductor laser light and by the infrared semiconductor laser light. In the focus detection, the disturbance by the guide grooves to the defocus signal is suppressed by adding all the defocus signals by the four-segment photodetectors. In the calculation by the differential push-pull method, a differential output between the push-pull signal from the sub spots and the push-pull signal from the main spot is obtained by adjusting the gain so as to equalize the signals. In the tracking error signal detection by the twin beam method, the tracking error signal is obtained by summing the signals from the segments of the light receiving part for each sub spot and calculating a difference between the sums for the two sub spots. The tracking error signal by the differential phase detection method is obtained from the light detecting region for the zero-order light.

FIG. 33 is a view showing a whole system configuration that uses the two-wavelength laser module. Light emitted from the two-wavelength laser module 101 is collimated by the collimator lens 109 to be a collimated beam, is reflected by the erecting prism 3008, and is focused on the optical disk 3302 by the DVD/CD compatible objective lens 110. Note here that, in the figure, only the infrared laser chip 201 emits the light, whereas the laser light from the red laser chip 202 is indicated by broken lines for convenience. The reflected light returns the same optical path, is diffracted by the polarization-dependent diffraction grating 107, and is received by the photodetectors 3303, 3304. The received light signals are subjected to signal detection by the detection circuit 3307 and by the tracking error detection circuit 3308, and by driving the lens actuator 3301 with the signals thus detected through the driver circuit 3312, the focus control and tracking control are executed. Note here that the optical reproducing apparatus is configured to be able to record the S-shaped waveform amplitude of the defocus signal and the tracking error signal amplitude by a control microcomputer 3309 and keep them in memory 3310. The tracking error detection circuit 3308 is capable of choosing and outputting the tracking error signal by one of the differential push-pull method, the twin beam method, and the differential phase detection method in response to an input from the control microcomputer. Further, the signal from the photodetector is also inputted into the reproduced signal detector 3311, which outputs the reproduced signal. The control microcomputer 3309 executes control of the gain control for the reproduced signal detection circuit according to the disk, and at the same time monitors the reproduced signal to keep its maximum level in the memory 3310. The control microcomputer 3309 discriminates whether the disk is of the DVD system or of the CD system from the focusing signal, and controls which should be made to emit the light, the infrared semiconductor laser 201 or the red semiconductor laser 202, by the output of the LD driver circuit 3306 through the switching circuit 3305. Moreover, the control microcomputer 3309 discriminates what classification the current disk is by the push-pull tracking error signal amplitude and the level of the reflected light, determines a method to be selected in the tracking error detection circuit to achieve the control of the tracking error detection circuit. Furthermore, the control microcomputer 3309 controls the rotation frequency of a spindle motor 3314 through the driver circuit 3313 according to the selected classification of the disk. In addition, the control microcomputer 3309 executes recording and reproducing processing after that.

FIG. 34 is a chart showing a flow of discriminating the medium in a system of FIG. 33. First, the infrared LD is turned on, the S-shaped waveform amplitude (A1) of the defocus signal (AF signal) and the maximum reflected light quantity (T1) are acquired for the infrared LD and are stored in the memory. Then, the laser to be made to emit is switched over to the laser of a red wavelength, and similarly the S-shaped waveform amplitude (A2) of the defocus signal (AF signal) and the maximum reflected light quantity (T2) are acquired, and are stored in the memory. From these results, the S-shaped waveform amplitudes for the two wavelengths each normalized to the its maximum reflected light quantity are compared, and the wavelength of the signal having larger amplitude is determined as a correct wavelength. That is, it is correct that the red laser is used in the DVD system and the infrared laser is used in the CD system and the focused spot that is optimized either for a substrate of 0.6 mm thickness, if the laser is red, or for a substrate of 1.2 mm thickness, if the laser is infrared, can be obtained with the DVD/CD compatible objective lens. On the contrary to this, if a wrong wavelength is used, the light is converged after it passed a substrate whose thickness is different from the suitable thickness for the wavelength, and consequently large spherical aberration occurs in the focused spot and the S-shaped waveform amplitude reduces. Thereby, the correct wavelength can be chosen. Next, when the disk is determined as of the CD system, the reflectance by the red laser is checked. That is, from the received maximum light quantity to the emitting laser power, the reflectance of the disk can be estimated, and then from whether or not this value is not less than 50%, it is discriminated whether it is CD-R/RW or CD-ROM. Since CD-R has a recording film of a dye, the reflectance is as high as almost 70% at an infrared wavelength (780 nm) but it decreases to 20% or less at a red wavelength (650 nm), which is disclosed by JP-A No. 55363/1996 (FIG. 14). Therefore, if the threshold is set to, for example, 50%, these CD-R/RW can be differentiated from CD-ROM. If the disk is discriminated to be CD-R/RW, the focus control is executed, the control information region of the disk is checked, and it is discriminated whether the disk is CD-R or CD-RW. Next, if the disk is discriminated to be of the DVD system, the red LD is turned on, the focus control is executed, and the push-pull signal amplitude is acquired. Because DVD-RAM is based on the land and groove recording system, its track pitch is wider than that of the DVD-R/RW and the obtained push-pull signal after being normalized by the total reflected light quantity is close to 100%. On the other hand, in DVD-R/RW, the above-mentioned signal becomes about 25%. Therefore, by judging the magnitude of the amplitude with the threshold value being set to 50%, DVD-RAMcanbe identified. To further identify DVD-ROM, R, and RW, after executing the focus control and the tracking control by the differential push-pull method, control data in the innermost circumferential region of the disk is reproduced, and thereby final discrimination of the classification is performed.

FIG. 35 is a view showing definitions for the defocus signal amplitude and for the maximum reflected light quantity. In the presence of defocus caused by disk plane flattering, the defocus signal in the vicinity of an in-focus position exhibits an S-shaped waveform. At this time, a total sum signal of light entering the detector is as shown in the bottom figure, which exhibits a waveform having a maximum in a flat region in the vicinity of the in-focus position. The defocus signal amplitude and the maximum of the total reflected light quantity signal in FIG. 34 are defined as in FIG. 35.

The invention makes it possible to realize the optical head that is compatible with DVD Multi through the use of the hologram laser module, and to provide a small-size, high-performance optical reproducing apparatus.

The foregoing invention has been described in terms of preferred embodiments. However, those skilled, in the art will recognize that many variations of such embodiments exist. Such variations are intended to be within the scope of the present invention and the appended claims.

What is claimed is:

1. An optical reproducing apparatus for reproducing information recorded on plural classifications of media each having a different track pitch by irradiating light on said media, comprising:
    a light source for generating light fluxes of plural kinds of wavelengths;
    a lens for focusing said light fluxes on said media;
    means that is provided between said light source and said lens and that forms five spots 1mm a light flux having one wavelength selected from said light fluxes that have plural wavelengths, said five spots being formed so as to be irradiated non-collinearly on one medium of said media; and
    a photodetector for detecting reflected light fluxes of said five non-collinear spots from said one medium;
    wherein said five non-collinear spots comprise a main spot, two first sub spots, and two second sub spots, said two first sub spots being symmetrically arranged a first distance from the main spot, on opposing sides thereof in a radius direction of the-one medium, and said two second sub spots being symmetrically arranged a second distance from the main spot, on opposing sides thereof in the radius direction of the-one medium, and
    wherein the second distance is about twice the first distance.

2. An optical reproducing apparatus according to claim 1, wherein the photodetector includes a single-segment light receiving part that detects a reproduced RF signal from one of said media, and is not divided.

3. An optical reproducing apparatus according to claim 1, wherein said photodetector is comprised of 6 four-segment light detecting regions and 3 tight detecting regions each of which is not divided.

4. An optical reproducing apparatus according to claim 1, wherein said photodetector is comprised of 6 four-segment light detecting regions and 6 light detecting regions each of which is not divided.

5. An optical reproducing apparatus according to claim 1, wherein said photodetector is comprised of 10 four-segment light detecting regions and 5 light detecting regions each of which is not divided.

6. An optical reproducing apparatus according to claim 1, wherein said photodetector is comprised of 10 four-segment light detecting regions and 10 light detecting regions each of which is not divided.

7. An optical reproducing apparatus according to claim 1, wherein said photodetector is comprised of 4 three-segment light detecting regions, 8 two-segment photodetectors, and 9 light detecting regions each of which is not divided.

8. An optical reproducing apparatus according to claim 1, wherein said photodetector is comprised of 4 three-segment light detecting regions, 8 two-segment photodetectors, and 12 light detecting regions each of which is not divided.

9. An optical reproducing apparatus according to claim 1, wherein said light source and said photodetectors are formed on a single substrate.

10. An optical reproducing apparatus according to claim 1, further comprising discriminating means for discriminating one medium of said different, plural classifications of media, and a control part for performing control so that a tracking error signal is generated by a different method corresponding to the medium that was discriminated by said discriminating means.

11. An optical reproducing apparatus according to claim 1,
wherein a light receiving part of said photodetector is divided into a plurality of parts.

12. An optical reproducing apparatus according to claim 1,
wherein each of said media has a grooved structure, and a width of each groove is equal to a width of a spacing, between adjacent grooves.

13. An optical reproducing apparatus according to claim 1,
wherein said optical reproducing apparatus is adapted to reproduce information from a plurality of kinds of the media by using the light flux having one wavelength.

14. An optical reproducing apparatus according to claim 1, wherein each of said media has a grooved structure, and wherein a first one of the first sub spots and a first one of the second sub spots arranged on the same side of the main spot in the radius direction of the media have a distance therebetween that is about ½ a pitch of the grooves.

15. An optical reproducing apparatus for reproducing information recorded on plural classifications of media each having a different track pitch by irradiating light on said media, comprising:
a light source for generating light fluxes of plural kinds of wavelengths;
a lens for focusing said light fluxes on said media;
means that is provided between said light source and said lens and that forms five spots from a light flux having one wavelength selected from said light fluxes that have plural wavelengths and are used to be irradiated on said medium; and
a photodetector for detecting reflected light fluxes of said five spots from said medium;
wherein said plural classifications of media are DVD-ROM, DVD-RAM, DVD-R, DVD-RW, CD-ROM, CD-R, and CD-RW, and tracking error signals from said media are formed from said five spots for each of said respective media by said following methods: for DVD-ROM, by the differential phase detection method; for DVD-RAM, by the differential push-pull method; for DVD-R and DVD-RW, by the differential push-pull method at the time of recording and by either of the differential pushpull method or the differential phase detection method at the time of reproducing; for CD-ROM, by one of the twin beam method, the differential push-pull method, and the differential phase detection method; for CD-R and CD-RW, by the differential push-pull method at the time of recording and by one of the twin beam method, the differential push-pull method, and the differential phase detection method at the time of reproducing.

16. An optical reproducing apparatus according to claim 1, wherein said plural classifications of media are DVD-ROM, DVD-RAM, DVD-R, DVD-RW, CD-ROM, CD-R, and CD-RW, and a defocus signal from each medium is formed from said five spots by either of the astigmatic method or the spot-size detection method.

17. An optical reproducing apparatus according to claim 1, wherein means for forming said five spots is a complex diffraction grating having alternating zonal regions of optical characteristics corresponding respectively to the forming of said five spots.

\* \* \* \* \*